United States Patent

Mora-Puchalt

(10) Patent No.: US 11,392,155 B2
(45) Date of Patent: Jul. 19, 2022

(54) LOW POWER VOLTAGE GENERATOR CIRCUIT

(71) Applicant: Analog Devices International Unlimited Company, Limerick (IE)

(72) Inventor: Gerard Mora-Puchalt, Catarroja (ES)

(73) Assignee: Analog Devices International Unlimited Company, Limerick (IE)

( * ) Notice: Subject to any disclaimer, the term of this patent is extended or adjusted under 35 U.S.C. 154(b) by 244 days.

(21) Appl. No.: 16/536,881

(22) Filed: Aug. 9, 2019

(65) Prior Publication Data

US 2021/0041902 A1 Feb. 11, 2021

(51) Int. Cl.
*G05F 1/567* (2006.01)
*H02P 9/32* (2006.01)
(Continued)

(52) U.S. Cl.
CPC ............... *G05F 1/567* (2013.01); *H02J 7/24* (2013.01); *H02P 9/32* (2013.01); *H02P 2101/30* (2015.01)

(58) Field of Classification Search
CPC . G05F 1/567; G05F 3/24; G05F 3/245; G05F 3/262; H02J 7/24; H02P 9/32; H02P 2101/30; H02M 3/06
(Continued)

(56) References Cited

U.S. PATENT DOCUMENTS 4,361,797 A * 11/1982 Kojima ................... G05F 3/247
330/288
5,563,501 A 10/1996 Chan
(Continued)

FOREIGN PATENT DOCUMENTS

CN 102681584 A 9/2012
CN 102915065 A 2/2013
(Continued)

OTHER PUBLICATIONS

Attached STIC search report from EIC 2800 searcher Mesfin Getaneh for claim 1 on Jan. 16, 2020. (Year: 2020).*
(Continued)

*Primary Examiner* — Shawki S Ismail
*Assistant Examiner* — Htet Z Kyaw
(74) *Attorney, Agent, or Firm* — Schwegman Lundberg & Woessner, P.A.

(57) ABSTRACT

A voltage generator circuit can be structured to provide an output voltage having a substantially flat temperature coefficient by use of a circuit loop having transistors and a resistor arranged such that, in operation, current through the resistor has a signed temperature coefficient. The current behavior can be controlled by an output transistor coupled to another transistor, which is coupled to the circuit loop, with this other transistor sized such that, in operation, a voltage of this other transistor has a signed temperature coefficient that is opposite in sign to the signed temperature coefficient of the current through the resistor. Embodiments of voltage generator circuits can also include additional components to trim output voltage, to provide unconditional stability, or
(Continued)

other features for the respective voltage generator circuit. In various embodiments, a voltage generator circuit can be implemented as a low drop-out (LDO) voltage regulator.

18 Claims, 18 Drawing Sheets

(51) Int. Cl.
  *H02J 7/24* (2006.01)
  *H02P 101/30* (2015.01)
(58) Field of Classification Search
  USPC .......................................................... 323/313
  See application file for complete search history.

(56) References Cited

U.S. PATENT DOCUMENTS

| | | | |
|---|---|---|---|
| 5,627,461 A | 5/1997 | Kimura | |
| 6,054,876 A * | 4/2000 | Horie | H03F 3/45183 327/437 |
| 6,677,735 B2 | 1/2004 | Xi | |
| 6,710,583 B2 | 3/2004 | Stanescu et al. | |
| 7,312,598 B1 | 12/2007 | Huang | |
| 7,589,507 B2 | 9/2009 | Mandal | |
| 8,324,876 B1 | 12/2012 | Le et al. | |
| 8,508,307 B2 * | 8/2013 | Mitsuda | H03L 1/04 327/539 |
| 8,907,652 B2 * | 12/2014 | Lecce | G05F 3/30 327/539 |
| 8,922,289 B2 * | 12/2014 | Mitsuda | H03L 1/04 327/132 |
| 9,024,602 B2 | 5/2015 | Fort et al. | |
| 9,146,569 B2 | 9/2015 | Li et al. | |
| 10,496,122 B1 * | 12/2019 | Gottapu | G05F 3/30 |
| 10,585,447 B1 * | 3/2020 | Tanimoto | G05F 3/242 |
| 10,775,828 B1 * | 9/2020 | Lee | G05F 3/30 |
| 2003/0038655 A1 * | 2/2003 | Minamizaki | H03F 3/211 327/66 |
| 2010/0289472 A1 | 11/2010 | Renous | |
| 2011/0193544 A1 * | 8/2011 | Iacob | G05F 3/242 323/315 |
| 2012/0212199 A1 | 8/2012 | Amer et al. | |
| 2013/0141140 A1 * | 6/2013 | Kumar | G11C 7/1057 327/108 |
| 2013/0193939 A1 * | 8/2013 | Sakaguchi | G05F 1/573 323/277 |
| 2013/0293313 A1 * | 11/2013 | Mitsuda | G05F 3/30 331/70 |
| 2014/0103900 A1 * | 4/2014 | Lahiri | G05F 3/24 323/313 |
| 2014/0117967 A1 * | 5/2014 | Mitsuishi | G05F 3/30 323/313 |
| 2014/0266140 A1 * | 9/2014 | Iriarte | G05F 3/242 323/313 |
| 2015/0063419 A1 * | 3/2015 | Obayashi | G01K 7/01 327/512 |
| 2016/0072516 A1 * | 3/2016 | Shill | H03M 1/002 341/118 |
| 2016/0172898 A1 * | 6/2016 | Willemin | H03K 3/021 320/101 |
| 2019/0079551 A1 | 3/2019 | Tourret | |
| 2019/0171241 A1 * | 6/2019 | Elsayed | G05F 1/565 |

FOREIGN PATENT DOCUMENTS

| | | | | |
|---|---|---|---|---|
| CN | 103792980 A | | 5/2014 | |
| CN | 204242021 U | | 4/2015 | |
| CN | 105974991 | * | 9/2016 | ............ G05F 1/567 |
| CN | 106575129 A | | 4/2017 | |
| CN | 108536207 A | | 9/2018 | |
| CN | 112346507 A | | 2/2021 | |
| DE | 102020120835 A1 | | 2/2021 | |
| JP | H07200086 A | | 8/1995 | |
| JP | 2011138192 | * | 7/2011 | ............... G05F 1/56 |
| JP | 2012043085 A | | 3/2012 | |
| TW | 201217932 A | | 5/2012 | |
| WO | WO-2018184015 A1 | | 10/2018 | |

OTHER PUBLICATIONS

Attached STIC search report from EIC 2800 searcher Steve Chung for claim 9 on Jan. 16, 2020. (Year: 2020).*
Attached STIC search report from EIC 2800 searcher John DiGeronimo for claim 17 on Jan. 16, 2020. (Year: 2020).*
Attached translated version of foreign patent CN 105974991. (Year: 2016).*
Attached translated version of JP 2011138192. (Year: 2011).*
Received STIC search report from EIC 2800 searcher Heidi Myers for claim 9 on Mar. 14, 2022. (Year: 2022).*
Received STIC search report from EIC 2800 searcher Michael Giles for claim 1 on Mar. 17, 2022. (Year: 2022).*
Received STIC search report from EIC 2800 searcher Emily P Huston for claim 5 on Mar. 21, 2022. (Year: 2022).*
Chen, Dongpo, et al., "A Low-dropout Regulator with Unconditional Stability and Low Quiescent Current", IEEE Intl. Conference on Communications, Circuits and Systems, (Jun. 2006), 4 pgs.
"Chinese Application Serial No. 202010788171.0, Office Action dated Dec. 3, 2021", w/o English translation, 13 pgs.
"German Application Serial No. 102020120835.9, Office Action dated Nov. 16, 2021", w/o English translation, 8 pgs.

* cited by examiner

LOW POWER VOLTAGE GENERATOR CIRCUIT

FIELD OF THE DISCLOSURE

This document relates to voltage generators and in particular to regulators.

BACKGROUND

There are an increasing number of applications, such as smart sensors, healthcare wearables, portable instruments, or infrastructure monitoring systems that include components that operate from battery power. Such battery powered applications can have enhanced performance when provided with electronics having high linearity and dynamic range, low offset and thermal drifts, and very low power consumption.

SUMMARY OF THE DISCLOSURE

A voltage generator circuit can be structured to provide an output voltage having a substantially flat temperature coefficient by use of a circuit loop having transistors and a resistor arranged such that, in operation, current through the resistor has a signed temperature coefficient. The current behavior can be controlled by an output transistor coupled to another transistor, which is coupled to the circuit loop, with this other transistor sized such that, in operation, a voltage of this other transistor has a signed temperature coefficient that is opposite in sign to the signed temperature coefficient of the current through the resistor. Additional components can be included to trim output voltage, to provide unconditional stability, or other features for the respective voltage generator circuit. The voltage generator circuit can be implemented as a low drop-out (LDO) voltage regulator.

For example, a voltage generator circuit can be provided that can comprise: a circuit loop having transistors and a first resistor, with the first resistor coupled to a first transistor of the transistors and arranged such that, in operation, current through the first resistor has a first signed temperature coefficient; an output transistor coupled to an output node of the voltage generator circuit; and a transistor coupled to the output transistor through a second resistor, the transistor coupled to the first transistor, the transistor sized such that, in operation, a voltage of the transistor has a second signed temperature coefficient, opposite in sign to the first signed temperature coefficient, wherein the transistors of the circuit loop, the output transistor, the transistor coupled to the output transistor, the first resistor, and the second resistor can be sized and arranged to provide an output voltage at the output node having a substantially flat temperature coefficient.

A voltage generation method can be provided that can comprise: generating current through a first resistor to have a first signed temperature coefficient such as being based on a difference in current density between transistors in a circuit loop; and generating a voltage of a transistor coupled to an output transistor through a second resistor such as with the transistor sized such that the voltage has a second signed temperature coefficient, opposite in sign to the first signed temperature coefficient, wherein the transistors of the circuit loop, the output transistor, the transistor coupled to the output transistor, the first resistor, and the second resistor can be sized to provide an output voltage at the output node having a substantially flat temperature coefficient.

In various embodiments, a voltage generator circuit is provided that can comprise: means for generating current through a first resistor to have a first signed temperature coefficient based on a difference in current density between transistors in a circuit loop; and means for generating a voltage of a transistor coupled to an output transistor through a second resistor with the transistor sized such that the voltage has a second signed temperature coefficient, opposite in sign to the first signed temperature coefficient, wherein the transistors of the circuit loop, the output transistor, the transistor coupled to the output transistor, the first resistor, and the second resistor are sized to provide an output voltage at an output node having a substantially flat temperature coefficient.

In various embodiments, a voltage generator circuit is provided that can comprise: a first voltage generator circuit, providing a first voltage having a first signed temperature coefficient based on a difference in current density between transistors; and a second voltage generator circuit, providing a second voltage having a second signed temperature coefficient, opposite in sign to the first signed temperature coefficient, wherein the first voltage and the second voltage are configured in series with each other to generate a temperature stabilized output voltage at an output node.

In various embodiments, a voltage generator circuit is provided that can comprise: a first voltage generator circuit, providing a first voltage having a first signed temperature coefficient based on a difference in current density between transistors; a second voltage generator circuit, providing a second voltage having a second signed temperature coefficient, opposite in sign to the first signed temperature coefficient; and a third voltage generator circuit, providing a third voltage having a third signed temperature coefficient that is opposite in sign to the first signed temperature coefficient, with the third voltage generator circuit including independently adjustably specifiable temperature dependent and temperature stable components, wherein the first voltage, the second voltage, and the third voltage are configured in series with each other to generate a temperature stabilized output voltage at an output node.

In various embodiments, a voltage generation method is provided that can comprise: generating a first voltage having a first signed temperature coefficient based on a difference in current density between transistors; generating a second voltage having a second signed temperature coefficient, opposite in sign to the first signed temperature coefficient; and providing the first voltage and the second voltage in series with each other to generate a temperature stabilized output voltage at an output node.

In various embodiments, a voltage generation method is provided that can comprise: generating a first voltage having a first signed temperature coefficient based on a difference in current density between transistors; generating a second voltage having a second signed temperature coefficient, opposite in sign to the first signed temperature coefficient; generating a third voltage third voltage having a third signed temperature coefficient that is opposite in sign to the first signed temperature coefficient, wherein the third voltage is generated from independently adjustably specifiable temperature dependent and temperature stable components; and providing the first voltage, the second voltage, and the third voltage in series with each other to generate a temperature stabilized output voltage at an output node.

BRIEF DESCRIPTION OF THE DRAWINGS

The drawings, which are not necessarily drawn to scale, illustrate generally, by way of example, but not by way of limitation, various embodiments discussed in the present disclosure.

DETAILED DESCRIPTION

In ultra-low power applications, power consumption of an integrated circuit (IC) in both active and standby phases is an important parameter to enable long battery lifetime. There are a number of applications where a system is in a low power mode for most of the time and only powers up and becomes active for a short period of time such as to acquire a signal and transmit a conversion to a microcontroller. During the long periods of time of low power mode, full state retention is an important feature to avoid having to reconfigure the part every time it comes out of its standby phase into an active phase. By providing full state retention, power overhead is also minimized. In order to achieve this power performance, an ultra-low power LDO voltage regulator can be implemented.

Voltage regulators can be used to provide a stable power supply voltage independent of a number of factors such as load impedance, input-voltage variations, temperature, and time. A LDO regulator can help maintain regulation with small differences between supply voltage and load voltage. Low dropout refers to the smallest difference between the input and output voltages that allows an IC to maintain regulation of its output voltage. Lower dropout provides better efficiency. In various embodiments, an ultra-low power LDO regulator can operate in the range of hundreds of nano-amperes.

Figure 1:
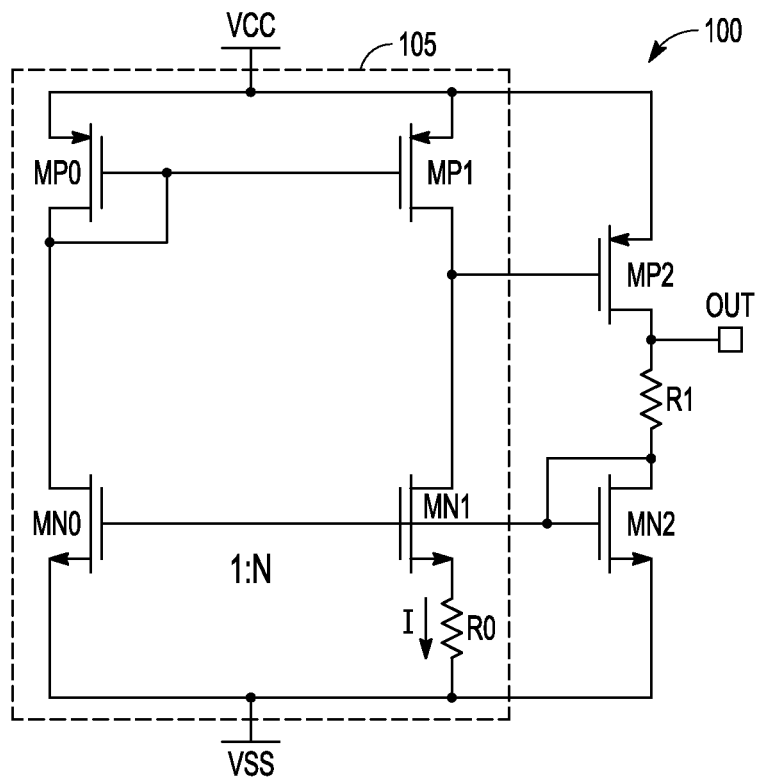
FIG. 1 illustrates an example of a voltage generator having a circuit loop and transistors to control generation of a current having a positive temperature coefficient through a resistor of the loop to provide a regulated output from the voltage generator, according to various embodiments.

FIG. 1 illustrates an example of a voltage generator 100 having a circuit loop 105 and transistors to control generation of a current having a positive temperature coefficient (tempco) through a resistor R0 of circuit loop 105 such as to provide a regulated output reference voltage from voltage generator 100. Voltage generator 100 can be structured as a LDO regulator. In FIG. 1, n-channel field effect transistor (NMOS) devices and p-channel field effect transistor (PMOS) devices are used. The NMOS and PMOS devices are devices that can include at least three terminals, which are referred to as a drain, a source, and a control gate where the gate is insulated from a channel between the conduction terminals provided by the drain and the source. Though NMOS and PMOS devices are used in the example architecture of FIG. 1 and example architectures of FIGS. 2-20, other devices, such as but not limited to bipolar junction transistor (BJT) devices, other types of field effect transistors, or other similar devices, can be used. The implementation of such other devices may include modifications to these architectures to account for the differences between such devices and NMOS and PMOS devices.

Circuit loop 105 includes NMOS devices (MN0 and MN1), PMOS devices (MP0 and MP1), and a resistor R0. MP0 is arranged as a diode-connected device to provide current to the circuit loop 105, in conjunction with MP1, from a supply source, Vcc. Circuit loop 105 can also be coupled to a NMOS device, MN2, with the gates of MN0, MN1, and MN2 coupled together. Resistor R0 along with MN0 and MN2 can be coupled to a supply source, Vss. Vss can be a ground. An output transistor device MP2 can be provided as a PMOS device.

The voltage generator 100 can be implemented with MN0 and MN1 structured to have different current densities. MN1 can be structured having a current density N times less than the current density of MN0. For example, MN1 can be structured as N times wider than MN0. Additionally or alternatively, MN1 can be structured as a NMOS transistor sized similarly to MN1, but in a parallel arrangement with a number of such replicated NMOS transistors. Other differences between MN1 and MN0 can be realized such as, but not limited to, differences in lengths of the MN1 and MN0 devices, to provide difference in current densities. The difference in current densities generates a voltage difference between their gate-to-source voltages (VGSs). MN0 has a gate-to-source voltage of VGS0 and MN1 has a gate-to-source voltage of VGS1, which is a smaller voltage than VGS0 because it is effectively a wider device. The voltage difference VGS1−VGS0 is forced across resistor R0, which generates a current, which has a positive tempco. This behavior can be controlled by circuit loop 105 formed by MN0, MN1, R0, MP0, and MP1 together with other devices such as MP2 and MN2.

The node connected to the drains of MN1 and MP1 can be structured as a high impedance node that can regulate the gate voltage of MP2, so that circuit loop 105 is stable. In this scenario, the positive tempco current generated across R0 is the same as the one flowing through MN2 and a resistor R1 that is coupled to MN2. MN2 can be sized so that its gate-to-source voltage (VGS2) has a negative tempco. Coupling MN2 to the output is R1, where the current across R1 has positive tempco as mentioned before. Therefore, the voltage across R1 (VR1) also has a positive tempco. The MOS devices and resistors of the voltage generator 100 having the architecture of FIG. 1 can be sized so that VGS2 plus the voltage across the resistor R1 has a flat temperature coefficient. This voltage is essentially the output reference voltage of voltage generator 100, VOUT=VGS2+VR1, which be implemented as a LDO output voltage.

Circuit loop 105, by means of the high impedance node driving the gate of the output device MP2, can also adapt to keep regulating in presence of an output resistive load. In other words, the device MP2 can provide the current to keep circuit loop 105 stable and can also source current to an output load. The output device MP2 is a PMOS device for low drop out regulation, but a NMOS device (MN7) can also be used as an output device as shown in FIG. 2.

Figure 2:
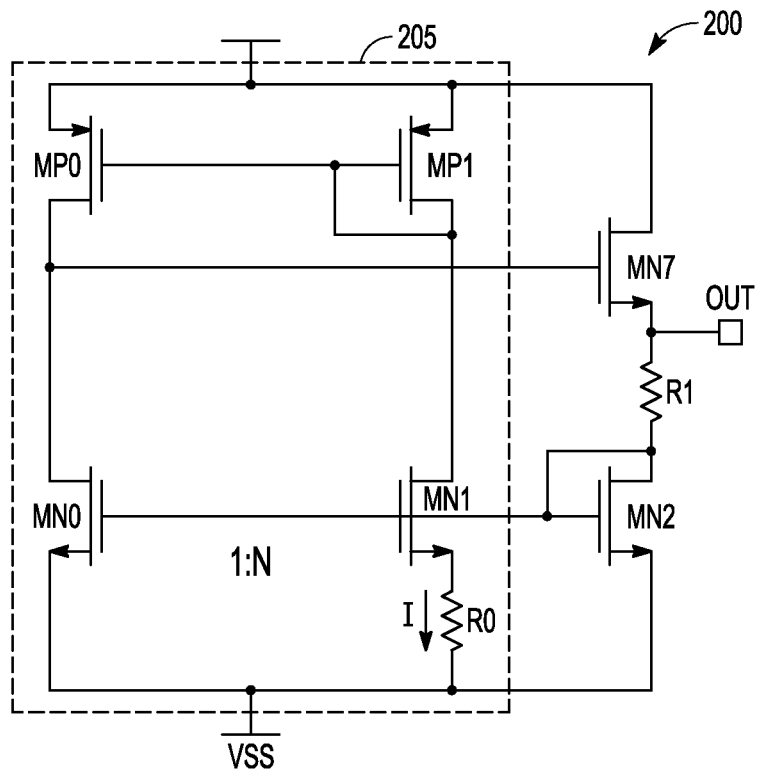
FIG. 2 illustrates an example of a voltage generator having a circuit loop and transistors to control generation of a current having a positive temperature coefficient through a resistor of the loop to provide a regulated output from the voltage generator, according to various embodiments.

FIG. 2 illustrates an example of a voltage generator 200 having a circuit loop 205 and transistors to control generation of a current having a positive tempco through a resistor R0 of the circuit loop 205 to provide a regulated output from the voltage generator. The voltage generator 200 of FIG. 2 can be implemented as voltage generator 100 of FIG. 1 with the output transistor device, MP2, replaced with a NMOS device, MN7. In order to keep circuit loop 205 stable, MN7 can be connected to the drain of PMOS device MP0 and the diode connected device is now MP1 instead of MP0.

Figure 3:
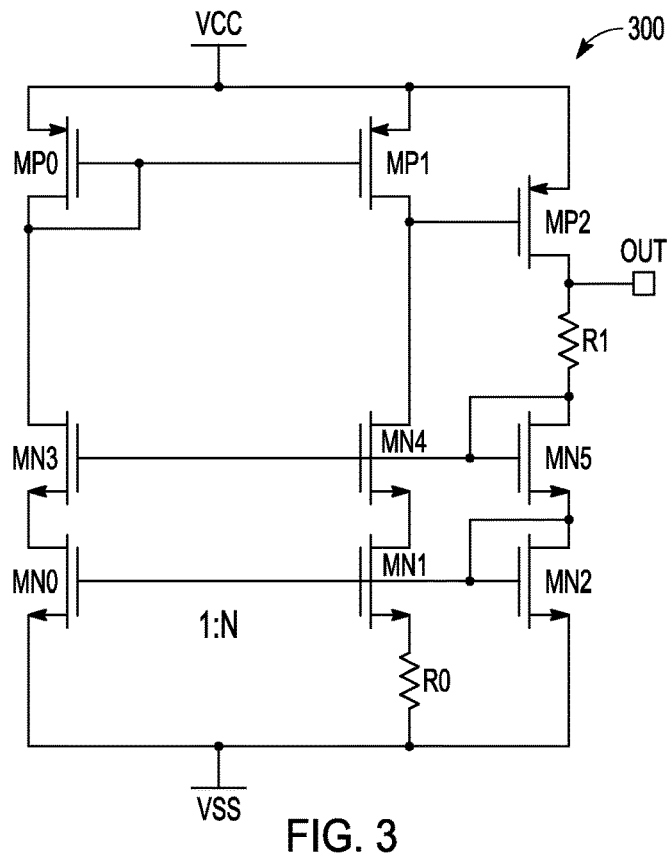
FIG. 3 shows an example of a voltage generator including one or more transistors added to achieve a higher output voltage, according to various embodiments.
Figure 4:
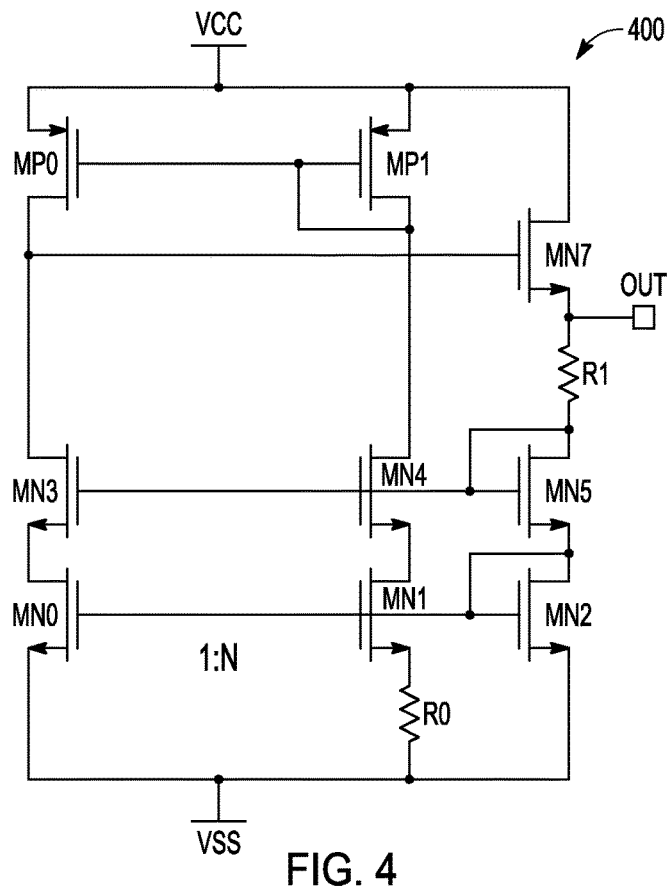
FIG. 4 shows an example of a voltage generator including one or more transistors added to achieve a higher output voltage, according to various embodiments.

FIG. 3 shows an example of a voltage generator 300 including one or more transistors added to achieve a higher output voltage. Voltage generator 300 can be implemented by adding a transistor device coupled to MN2 of voltage generator 100 of FIG. 1, having a PMOS output device. As shown in FIG. 4, voltage generator 400 also can be implemented by adding a transistor device coupled to MN2 of voltage generator 200 of FIG. 2, having a NMOS output device. A NMOS transistor device MN5 can be coupled between MN2 and R1 to shift the voltage of the output of the voltage generator 300 to a higher level than that of voltage generator 100. MN5 can be arranged in voltage generator 300 to have a negative tempco with respect to its VGS, similar to MN2. Additional NMOS transistor devices can be added having gates coupled to the gate of MN5. In FIGS. 3 and 4, a line of cascode NMOS devices MN3, MN4 and MN5 have been added. In this case, the output voltage becomes VOUT=VGS2+VGS5+VR1, where VGS5 is the gate to source voltage of MN5. These arrangements in FIGS. 3 and 4 can help improve output impedance and to achieve a higher LDO voltage than the voltage generator 100 of FIG. 1 and voltage generator 200 of FIG. 2.

Figure 5:
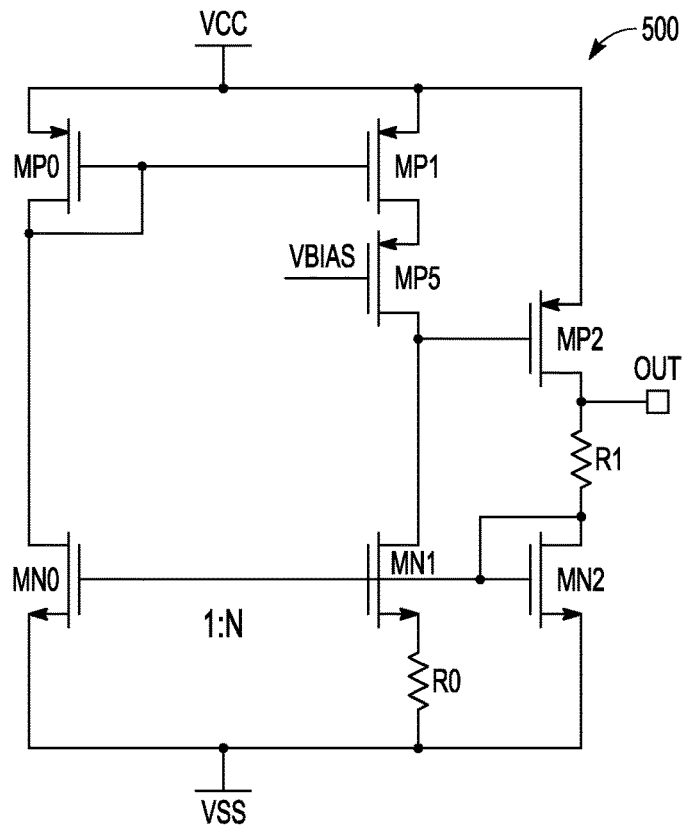
FIG. 5 shows an example of a voltage generator including a transistor added to achieve a higher output voltage, according to various embodiments.

FIG. 5 shows a voltage generator 500 including a transistor added to achieve a higher output voltage. Voltage generator 500 can be implemented by adding a transistor device coupled to output transistor device MP2 of voltage generator 100 of FIG. 1, having a PMOS output device. A PMOS transistor device MP5 can be coupled with its source coupled to the drain of MP1 and its drain coupled to the gate of MP2 and the drain of MN1. A voltage bias can be applied to the gate of MP5. In FIG. 5, a PMOS cascode is added on the PMOS side of the circuit loop to boost the loop gain. Higher loop gain can improve load regulation.

Figure 6:
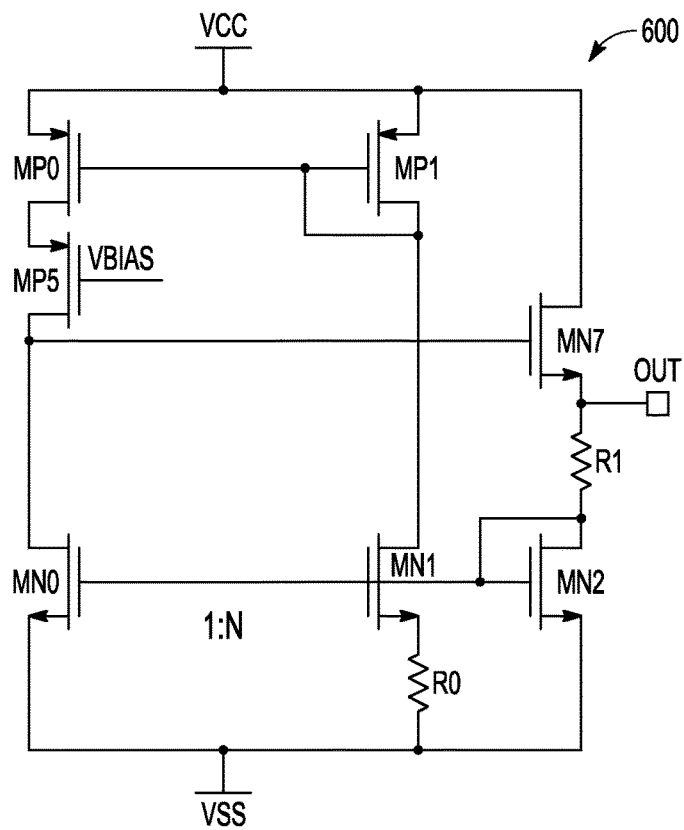
FIG. 6 shows an example of a voltage generator including a transistor added to achieve a higher output voltage, according to various embodiments.

FIG. 6 shows a voltage generator 600 including a transistor added to achieve a higher output voltage. Voltage generator 600 can be implemented by adding a transistor device coupled to output transistor device MN7 of voltage generator 200 of FIG. 2, having a NMOS output device. A PMOS transistor device MP5 can be coupled with its source coupled to the drain of MP0 and its drain coupled to the gate of MN7 and the drain of MN0. A voltage bias can be applied to the gate of MP5. In FIG. 6, a PMOS cascode is added on the PMOS side of the circuit loop to boost the loop gain. Higher loop gain can improve load regulation.

Figure 7:
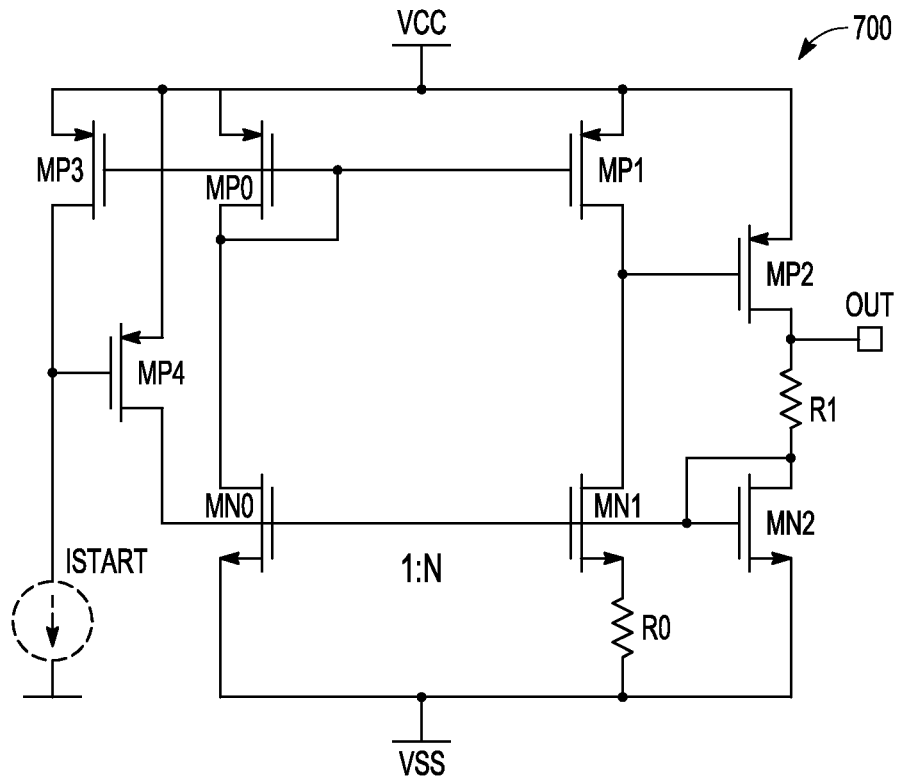
FIG. 7 shows an example of a voltage generator including a start-up circuit, according to various embodiments.
Figure 8:
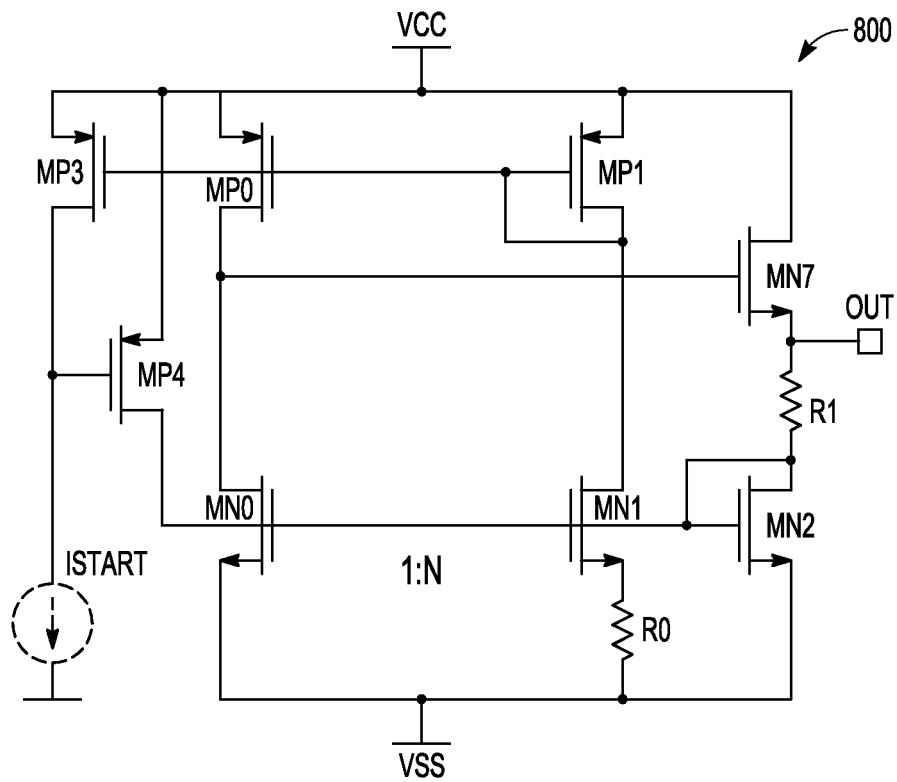
FIG. 8 shows an example of a voltage generator including a start-up circuit, according to various embodiments.

FIG. 7 shows an example of a voltage generator 700 including a start-up circuit added to ensure the loop starts and does not remain in an off-state. Voltage generator 700 can be implemented by adding a start-up circuit coupled to voltage generator 100 of FIG. 1, having a PMOS output device. As shown in FIG. 8, a voltage generator 800 also can be implemented by adding the start-up circuit coupled to voltage generator 200 of FIG. 2, having a NMOS output device. The start-up circuit can include PMOS devices, MP3 and MP4, and a current source Istart. The source of MP3 is coupled to VCC with its gate is coupled to the gates of MP0 and MP, and its drain is coupled to the gate of MP4 and to Istart. The source of MP4 is coupled to Vcc and its drain is coupled to the gates of MN0, MN1, and MN2. For this configuration, an always-on pull-down current Istart is present in the start-up circuit that pulls the gate of start-up device MP4 low. This start-up device pulls the gates of MN0, MN1 and MN2 high until the circuit loop starts. When the circuit loop starts, the loop current is mirrored via MP0 and MP3, which pulls the gate of MP4 high and turns off the start-up device MP4. This start-up circuit can also be implemented with a pull-up Istart current and a NMOS start-up device, instead of PMOS MP4. In this case, the loop current would be mirrored from MN2 into the start-up circuit.

Figure 9:
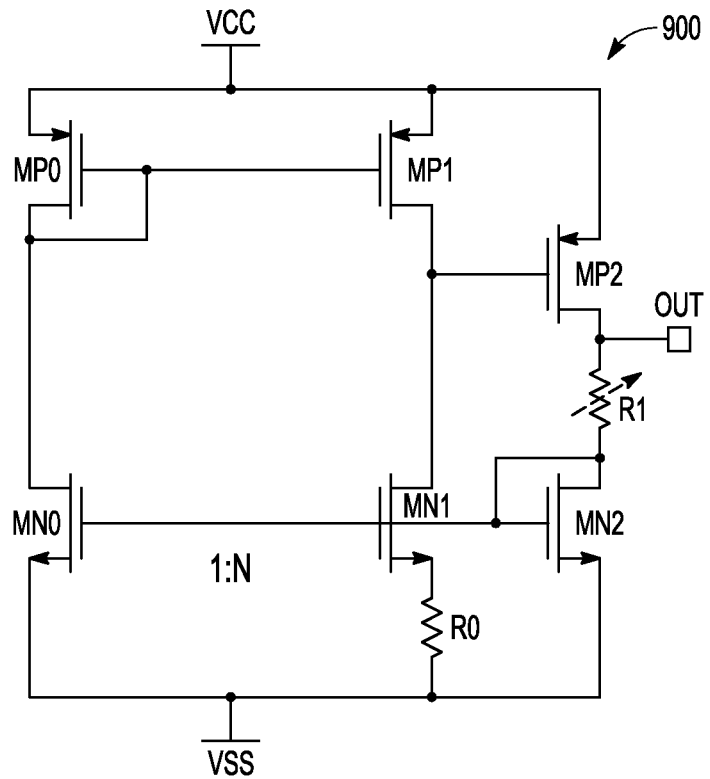
FIG. 9 shows an example of a voltage generator including a trimming scheme, according to various embodiments.
Figure 10:
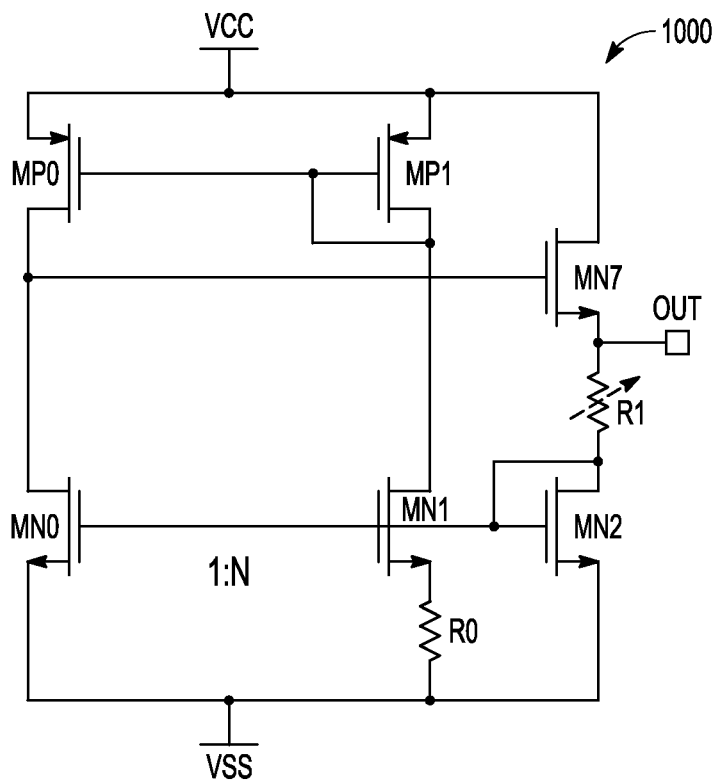
FIG. 10 shows an example of a voltage generator including a trimming scheme, according to various embodiments.

FIG. 9 shows an example of a voltage generator 900 including a trimming scheme. Voltage generator 900 can be implemented as voltage generator 100 of FIG. 1, having a PMOS output device, with R1 at the output realized as a variable resistor. A voltage generator 1000, shown in FIG. 10, also can be implemented as voltage generator 200 of FIG. 2, having a NMOS output device, with R1 at the output realized as a variable resistor. In voltage generator 100 of FIG. 1 and voltage generator 100 of 2, output voltage VOUT is equal to the gate-to-source voltage of MN2, which is VGS2 that is a negative voltage over temperature, plus the voltage drop across R1, which is a positive voltage over temperature. The sum of both these entities makes the output voltage flat over temperature. In order to trim, the output voltage to compensate for process and part-to-part variation, R1 can be made as an adjustable trim resistor. By changing the value of R1, the output voltage at room temperature will change, but its temperature coefficient also will change. This approach provides is a simple way to trim the output of the voltage generator, which can be a LDO regulator, where the absolute output voltage and the temperature coefficient have a strong dependency. This characteristic means that trimming for a given temperature coefficient will change the absolute output voltage and vice versa.

Figure 11:
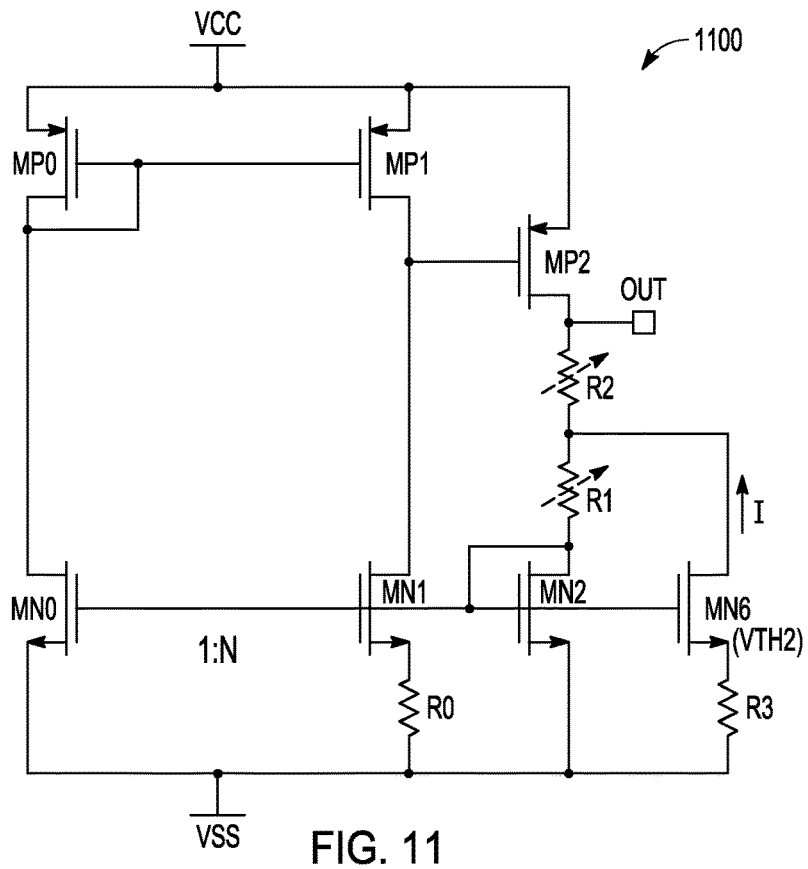
FIG. 11 shows an example of a voltage generator including a trimming scheme that decouples temperature coefficient from absolute value at the output of the voltage generator, according to various embodiments.
Figure 12:
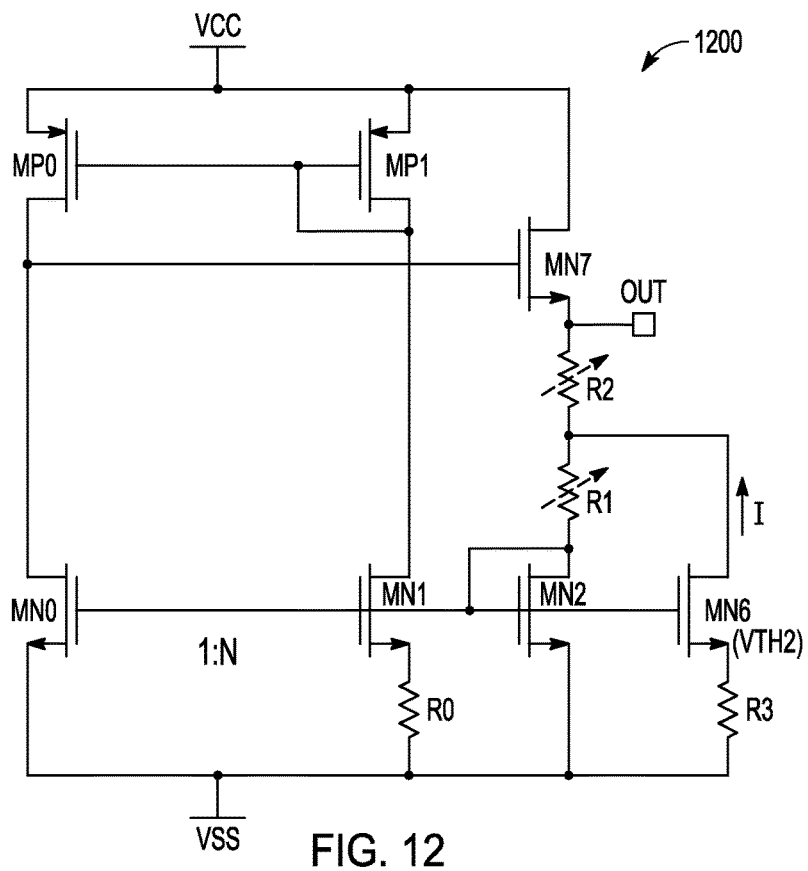
FIG. 12 shows an example of a voltage generator including a trimming scheme that decouples temperature coefficient from absolute value at the output of the voltage generator, according to various embodiments.

FIG. 11 shows a voltage generator 1100 including a trimming scheme that decouples the temperature coefficient from the absolute value at the output of the voltage generator. Voltage generator 1100 can be implemented as voltage generator 100 of FIG. 1, having a PMOS output device, or, as shown in FIG. 12, a voltage generator 1200 can be implemented as voltage generator 200 of FIG. 2, having a NMOS output device, with R1 realized as a variable resistor coupled with additional trimming components. In order to decouple the temperature coefficient trimming from the absolute voltage trimming, another trim resistor R2, which can be realized a variable resistor, and an arrangement of a NMOS device MN6 and a resistor R3 can be introduced. MN6 can be coupled to Vss by R3 and can include its gate coupled to the gates of MN2, MN1, and MN0. The device MN6 can be structured having a different threshold voltage, VTH2, from the other NMOS devices of voltage generator 1100 or voltage generator 1200. The threshold voltage of each of the other NMOS devices can have a threshold voltage VTH1. For example, MN2 can be a 3V device and MN6 can be a 1.8V device.

MN6 can be structured having a lower threshold voltage than MN2. This difference in threshold voltages, VTH2− VTH1, is relatively flat over temperature. The geometries of MN6 and MN2 can be chosen so that their gate-to-source voltages are also flat over temperature. With VGS2 being the gate-to-source voltage for MN2 and VGS6 being the gate-to-source voltage for MN6, the delta, VGS2−VGS6, is forced across resistor R3 and generates a constant over temperature current that flows through the drain of MN6 into the resistive structure R1 and R2. Due to this arrangement, there is a positive tempco current flowing through R1 and R2, and a constant tempco current flowing only through R2.

The output voltage tempco of voltage generator 1100 and the output voltage tempco of voltage generator 1200, which can be a LDO regulator, can be trimmed by adjusting the total sum of resistance, R1+R2. Once a flat tempco has been chosen, the total value of R1 and R2 can be maintained, such that the tempco does not change, but the ratio R2/R1 can be adjusted to trim for absolute voltage at room temperature without impacting the tempco. Therefore, this scheme fully decouples the tempco trimming from the absolute value trimming. Other equivalent implementations are possible, such as injecting the constant current over temperature at different tap points across the resistor R2.

Though voltage generator 1100 and voltage generator 1200 can be implemented with BJTs or transistor devices other than NMOS and PMOS, these circuits will be modified to generate the current provided by MN6 and R3. The modification is to be made since the current from operation of MN6 and R3 in voltage generator 1100 and voltage generator 1200 is based on a delta VTH, which does not occur with BJTs and may occur with other devices that can be used.

Figure 13A:
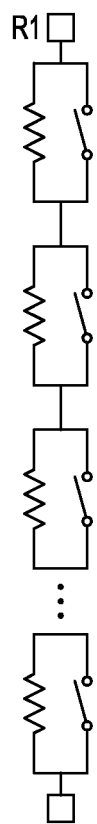
FIGS. 13A-13C shows examples of implementations of resistors that can be used in the voltage generators of FIGS. 11 and 12 shows an example voltage generator including a trimming scheme, according to various embodiments.
Figure 13B:
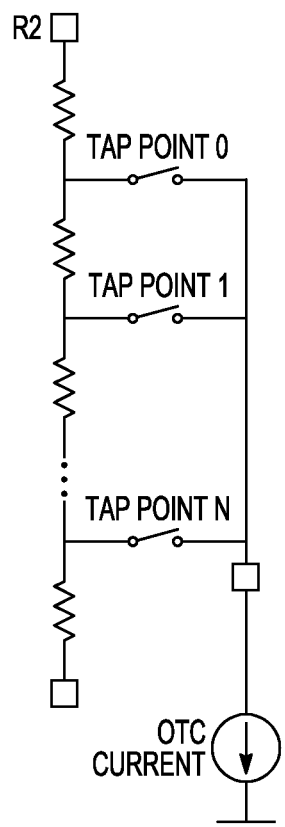
Figure 13C:
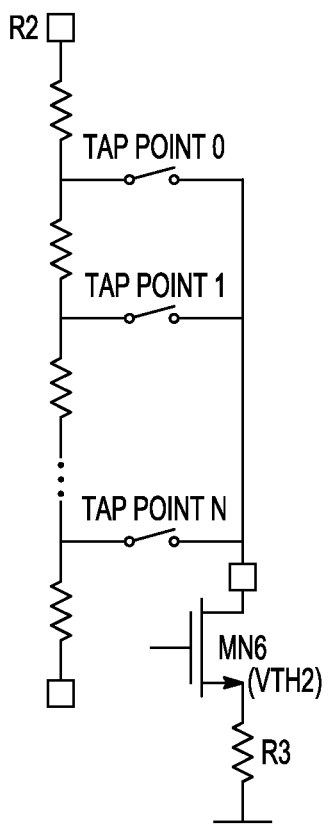

FIGS. 13A-C show implementations of R1, R2, and R3 for use in voltage generator 1100 of FIG. 11 and voltage generator 1200 of FIG. 12. FIG. 13A shows an implementation of R1 with resistor units and switches to short resistors units to increase or decrease the overall R1 final value depending on the number of shorted resistor units. The switches can be on or off indistinctively. Because R1 carries proportional-to-absolute-temperature (PTAT) current, this scheme can be employed for temperature coefficient trimming such as associated with FIGS. 9 and 10.

FIG. 13B and FIG. 13C show an implementation of R2 with resistor units and switches to select at which tap point offset temperature coefficient (OTC) current can be injected. FIG. 13B shows a current source providing the OTC current source and FIG. 13C shows MN6 and R3 providing the current, which can be the devices of voltage generator 1100 of FIG. 11 and voltage generator 1200 of 12. Only one switch can be enabled depending on trim code selected. In this configuration shown in FIG. 13B and FIG. 13C, the final overall R2 value is always the same but the tap point at which the OTC current is injected can be selected. The lower the tap point that is selected, the larger will be the voltage drop that the OTC current will generate through the resistor elements at the top of that tap point, and, therefore, the final output voltage of such a configured voltage generator will be higher. This scheme can be employed for absolute value trimming after the temperature coefficient trimming carried on R1.

Figure 14A:
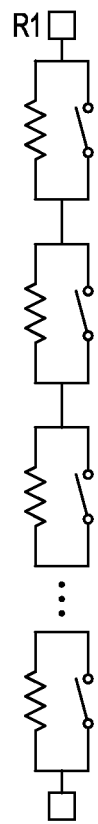
FIGS. 14A-14C shows examples of implementations of resistors that can be used in in the voltage generator of FIGS. 11 and 12, according to various embodiments.
Figure 14B:
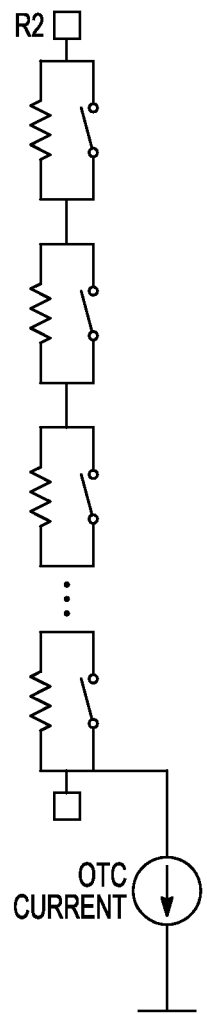
Figure 14C:
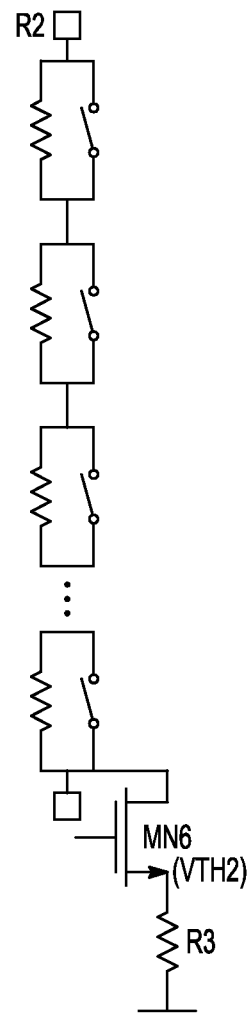

FIGS. 14A-C shows implementations of R1, R2, and R3 for use in voltage generator 1100 of FIG. 11 and voltage generator 1200 of FIG. 12. FIG. 14B shows a current source providing the OTC current and FIG. 14C shows MN6 and R3 providing the current, which can be the devices of voltage generator 1100 of FIG. 11 and voltage generator 1200 of FIG. 12. FIGS. 14A-C provide an alternative implementation of R1 and R2 to the implementation shown in FIGS. 13A-C. As in FIG. 13A, R1 in FIG. 14A is exercised for temperature coefficient trimming, which can be used such as associated with FIGS. 9 and 10.

FIGS. 14B and 14C show use of pairs of resistors and switches in parallel. Using the configuration of FIGS. 14B and 14C, when trimming R2 for absolute value, for each resistor unit that is switched in or out in R2, a counterpart resistor unit in R1 switches, out or in, in opposite function, so that the overall R1+R2 value is kept. In this manner, the temperature slope trimming is not impacted by the absolute value trimming. Therefore, in this scheme, trimming R2 for absolute value also implies trimming R1 again so overall R1+R2 value is preserved.

Figure 15:
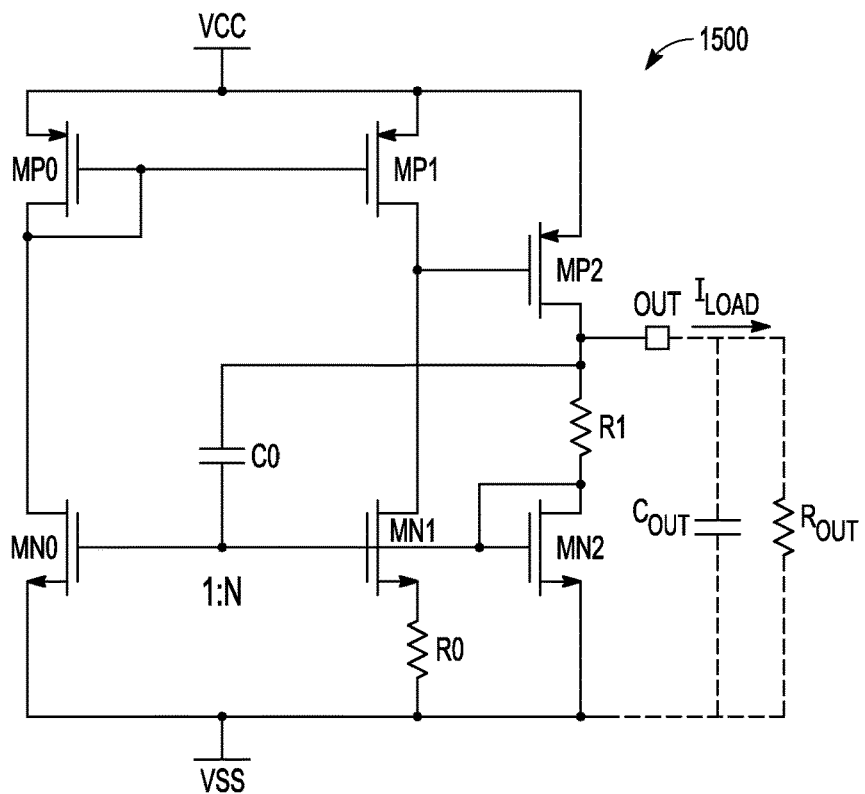
FIG. 15 shows an example of a voltage generator including compensation for output load capacitance and output load resistance, according to various embodiments.
Figure 16:
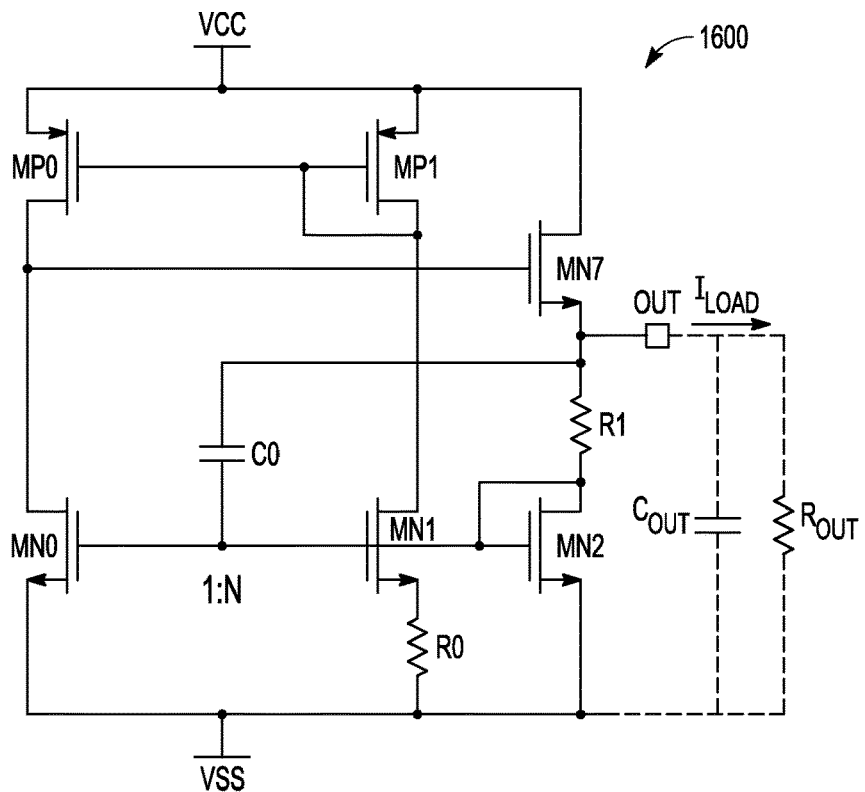
FIG. 16 shows an example of a voltage generator including compensation for output load capacitance and output load resistance, according to various embodiments.

FIG. 15 shows an example of a voltage generator 1500 including compensation for any output load capacitance and output load resistance. Voltage generator 1500 can be implemented as voltage generator 100 of FIG. 1, having a PMOS output device, with compensation, or, as shown in FIG. 16, a voltage generator 1600 can be implemented as voltage generator 200 of FIG. 2, having a NMOS output device, with compensation. In order to stabilize such a voltage generator, which can be configured as a LDO regulator, for any output load capacitance and output load resistance, a compensation capacitor C0 can be placed between the output node and the gates of MN0, MN1, and MN2 that are coupled together. This arrangement creates a zero that stabilizes the circuit loop for relatively small output currents. For example, C0 can be 20 pF, and the circuit loop is stable for output currents up to 100 µA, corresponding to 18 kOhms for load ROUT for a 1.8 V output voltage.

Figure 17:
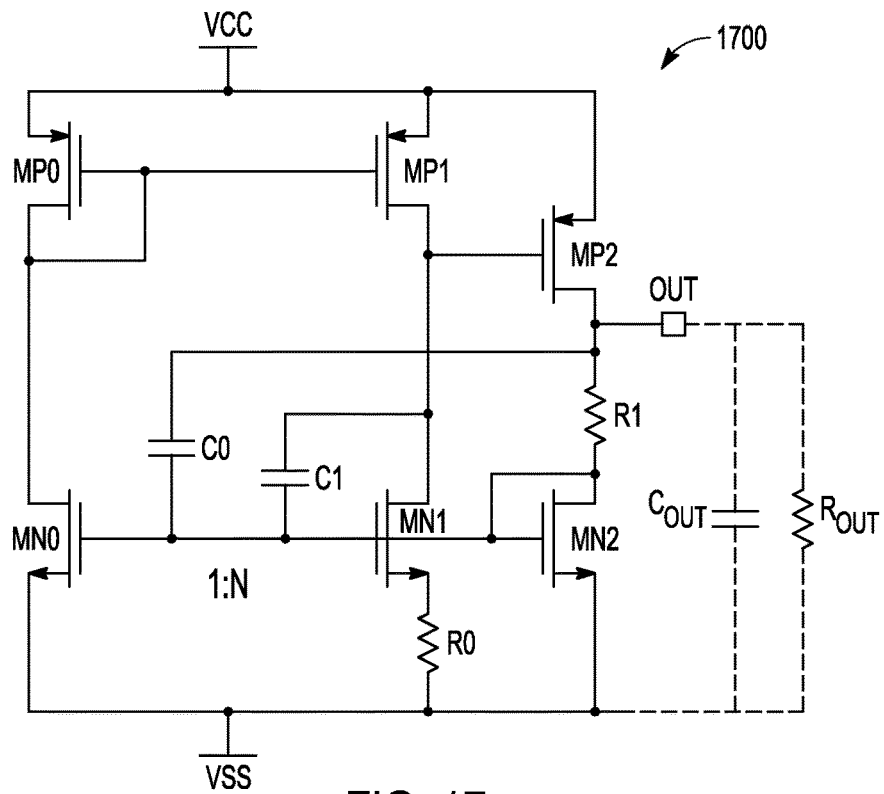
FIG. 17 shows an example voltage of a generator including compensation for output load capacitance and output load resistance that can be implemented to provide unconditional stability compensation, according to various embodiments.

FIG. 17 shows an example of a voltage generator 1700 including compensation for any output load capacitance and output load resistance that can be implemented to provide unconditional stability compensation. Voltage generator 1700 can be implemented as voltage generator 100 of FIG. 1, having a PMOS output device, with compensation, or as voltage generator 200 of FIG. 2, having a NMOS output device, with compensation. In order to stabilize such a voltage generator, which can be configured as a LDO regulator, for any output resistive and capacitive load, another capacitor C1 can be placed between the high impedance node, which is at the gate of MP2, and the gates of MN0, MN1, and MN2 that are coupled together. This capacitor helps to reduce or kill the gain and also introduces another zero that further helps stabilize the circuit loop for any capacitive and resistive load. In such architectures, the phase margin does not cross 180 degrees. In various embodiments, C0 and C1 can be structured to have a ratio of C0 to C1 equal to ten. For example, with C0 being 20 pF, C1 can be selected to have a value of 2 pF. Other values of C0, C1, and ratio of C0 to C1 can be implemented.

Figure 18:
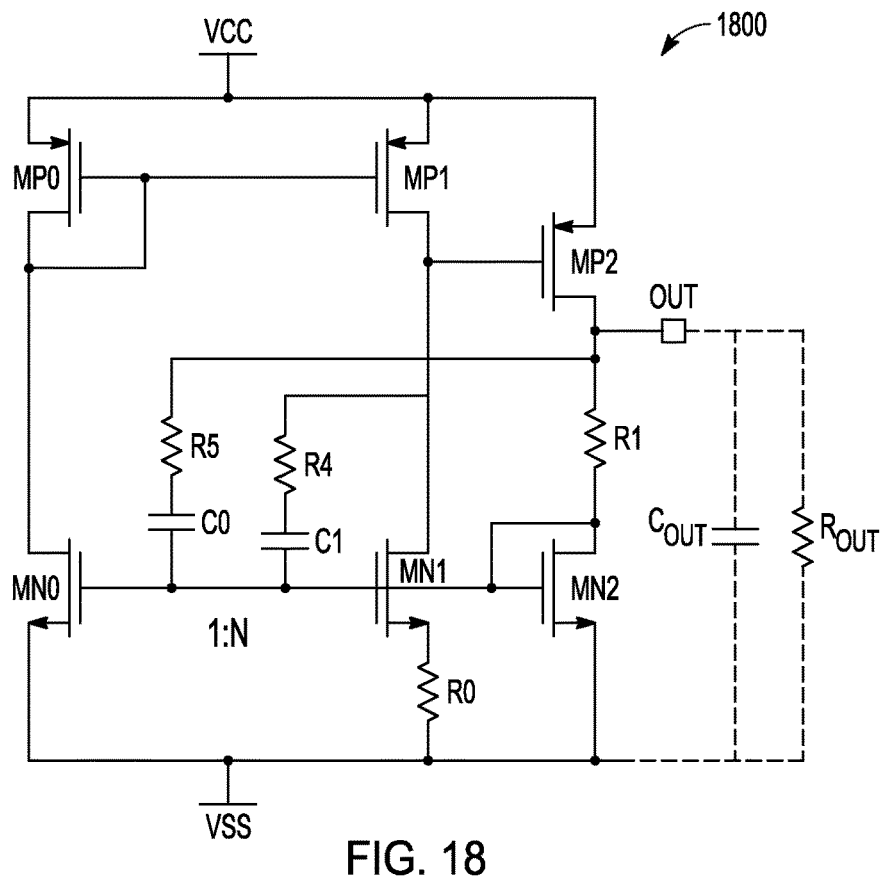
FIG. 18 shows an example of a voltage generator including compensation resistors placed in the voltage generator of FIG. 17 for output load capacitance and output load resistance, according to various embodiments.

FIG. 18 shows an example of a voltage generator 1800 including compensation resistors placed in the voltage generator 1700 of FIG. 17 for any output load capacitance and output load resistance. The compensation effect in the voltage generator 1700 of FIG. 17 can also be boosted by placing compensation resistors in series with the compensation capacitors. As shown in FIG. 18, resistor R5 can be placed in series with C0 between the output node and the gates of MN0, MN1, and MN2 that are coupled together. A resistor R4 can be placed in series with C1 between the gate of MP2 and the gates of MN0, MN1, and MN2 that are coupled together.

Figure 19:
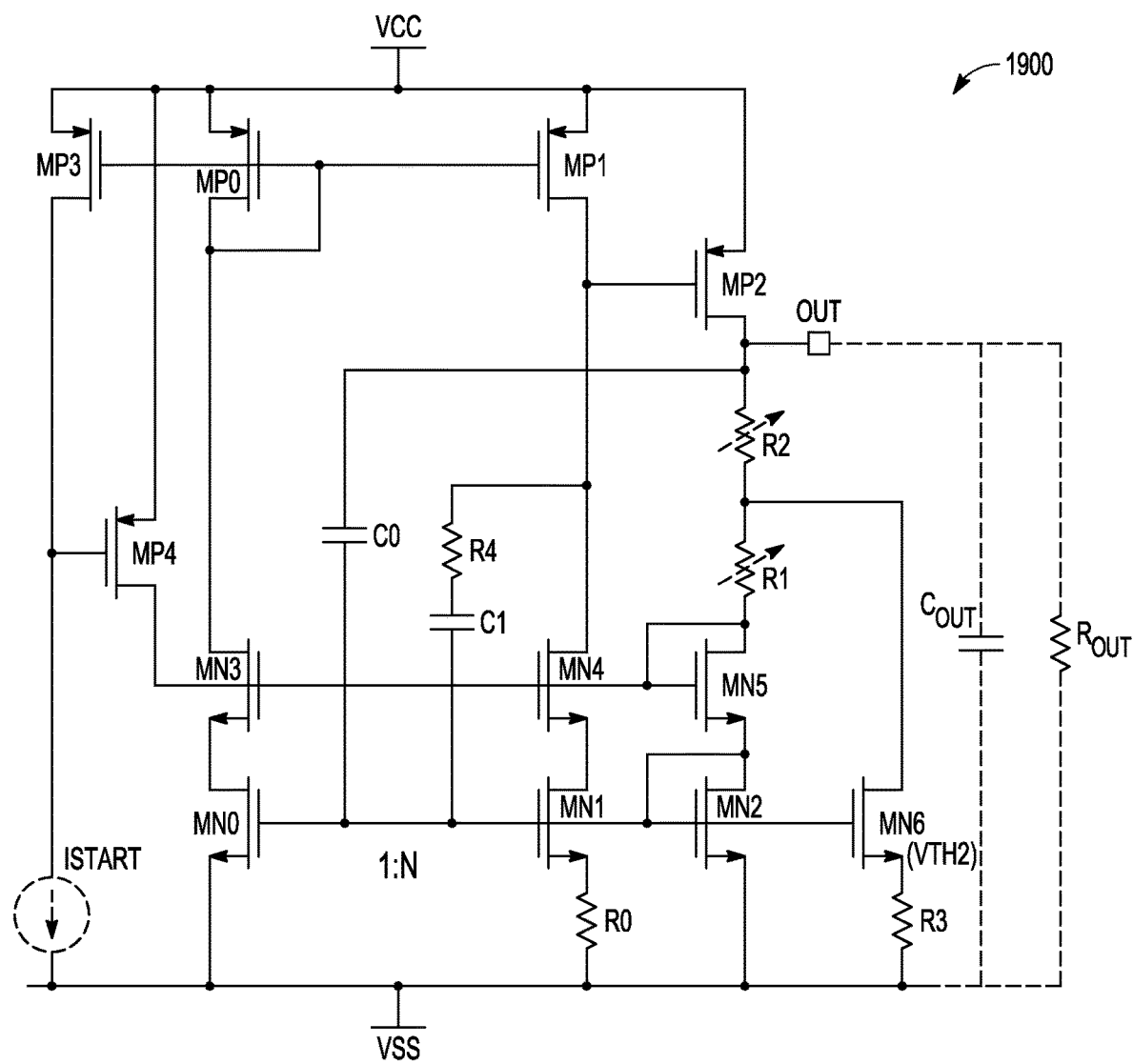
FIG. 19 shows a schematic of an example of a voltage generator that includes the architecture of the voltage generator of FIG. 1 with additional components, according to various embodiments.

FIG. 19 shows a schematic of an example of a voltage generator 1900 that includes the basic architecture of voltage generator 100 of FIG. 1 with additional components to provide enhanced output voltage, a start-up circuit, output trimming, and unconditional stability compensation. The components shown in FIG. 19 can be implemented such as discussed with respect to the components in FIGS. 1-18. The voltage generator 1900 can be implemented as a LDO regulator. The LDO regulator can be implemented as an ultra-low power LDO regulator by using a low power design to minimize the number of legs configured in the LDO regulator, which by doing so, also minimizes the operational power. The components of voltage generator 1900, as taught herein, can be structured to provide a total supply current is 125 nA plus any extra current that may be taken by the load of voltage generator 1900. The architecture of voltage generator 1900 can provide for stabilization for any capacitive and resistive load. For example, capacitive loads can range, but are not limited to, from about 1 pF up to about 10 µF and beyond and resistive loads can range, but are not limited to, from about 1 nA up to about 10 mA and beyond, while the core of voltage generator 1900, which can be arranged as a LDO, itself takes only 125 nA under any load condition. This architecture also allows for a trimming scheme that decouples the output voltage temperature coefficient from the absolute voltage trimming.

The architecture of a voltage generator 1900 shows an implementation with a PMOS output stage provided by MP2 device. This PMOS output stage is typical for low drop-out regulation because it can be implemented to only use a headroom equal to its saturation drain-to-source voltage, which is normally around 100 mV.

Figure 20:
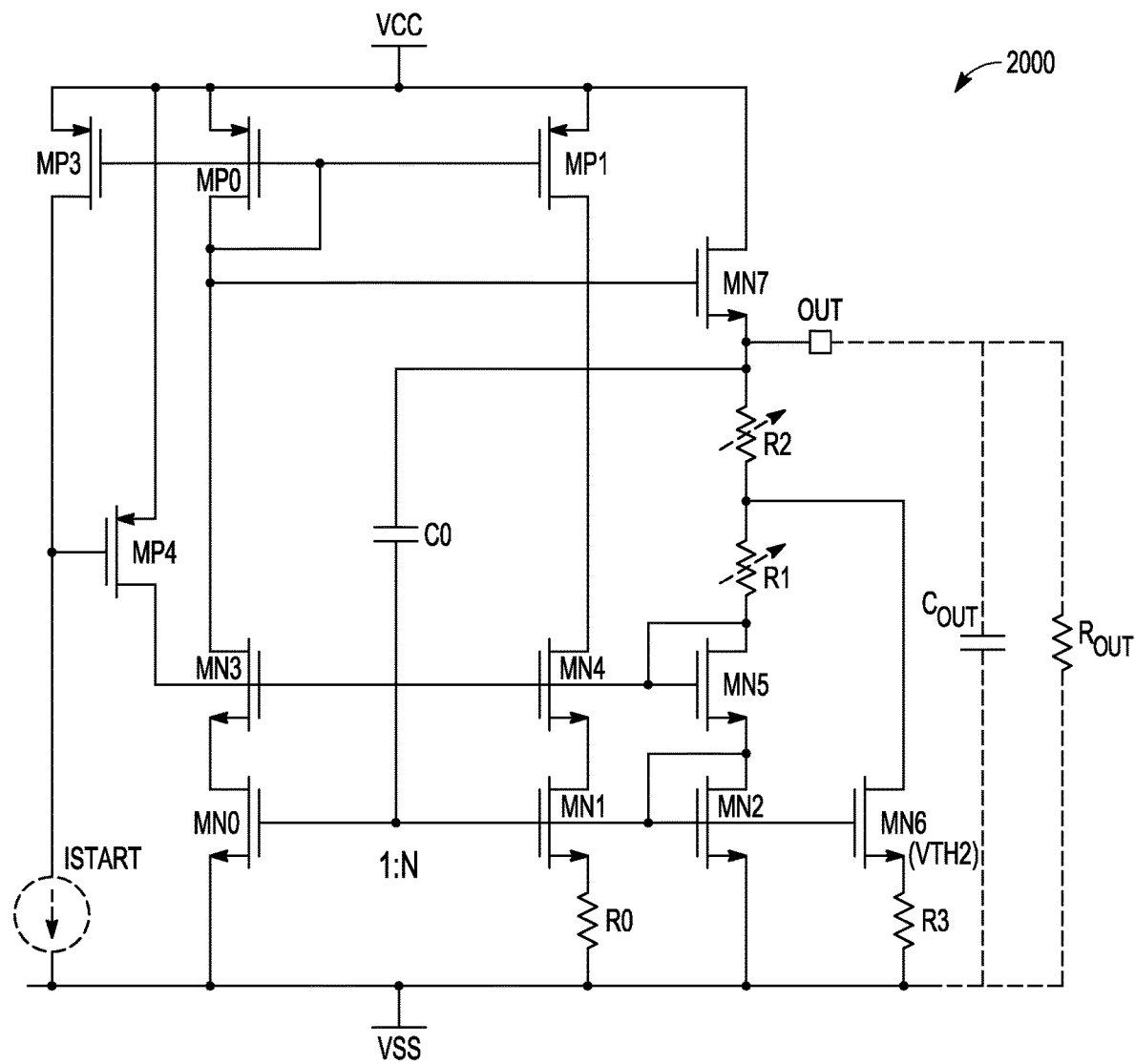
FIG. 20 shows an example of a voltage generator that includes the architecture of voltage generator of FIG. 2 with additional components, according to various embodiments.

FIG. 20 shows an example of a voltage generator 2000 that includes the basic architecture of voltage generator 200 of FIG. 2 with additional components to provide enhanced output voltage, a start-up circuit, output trimming, and unconditional stability compensation. The components shown in FIG. 20 can be implemented as discussed with respect to the components in FIGS. 1-18. The use of a NMOS output stage provided by MN7 device makes voltage generator 2000 a counterpart to voltage generator 1900 of FIG. 19. Although the NMOS output stage regulator typically may not be considered low drop-out, the output device can still be a low threshold voltage device or a native NMOS device, operation of which can be quite similar to the PMOS counterpart in low drop-out mode of voltage generator 1900 of FIG. 19.

Figure 21:
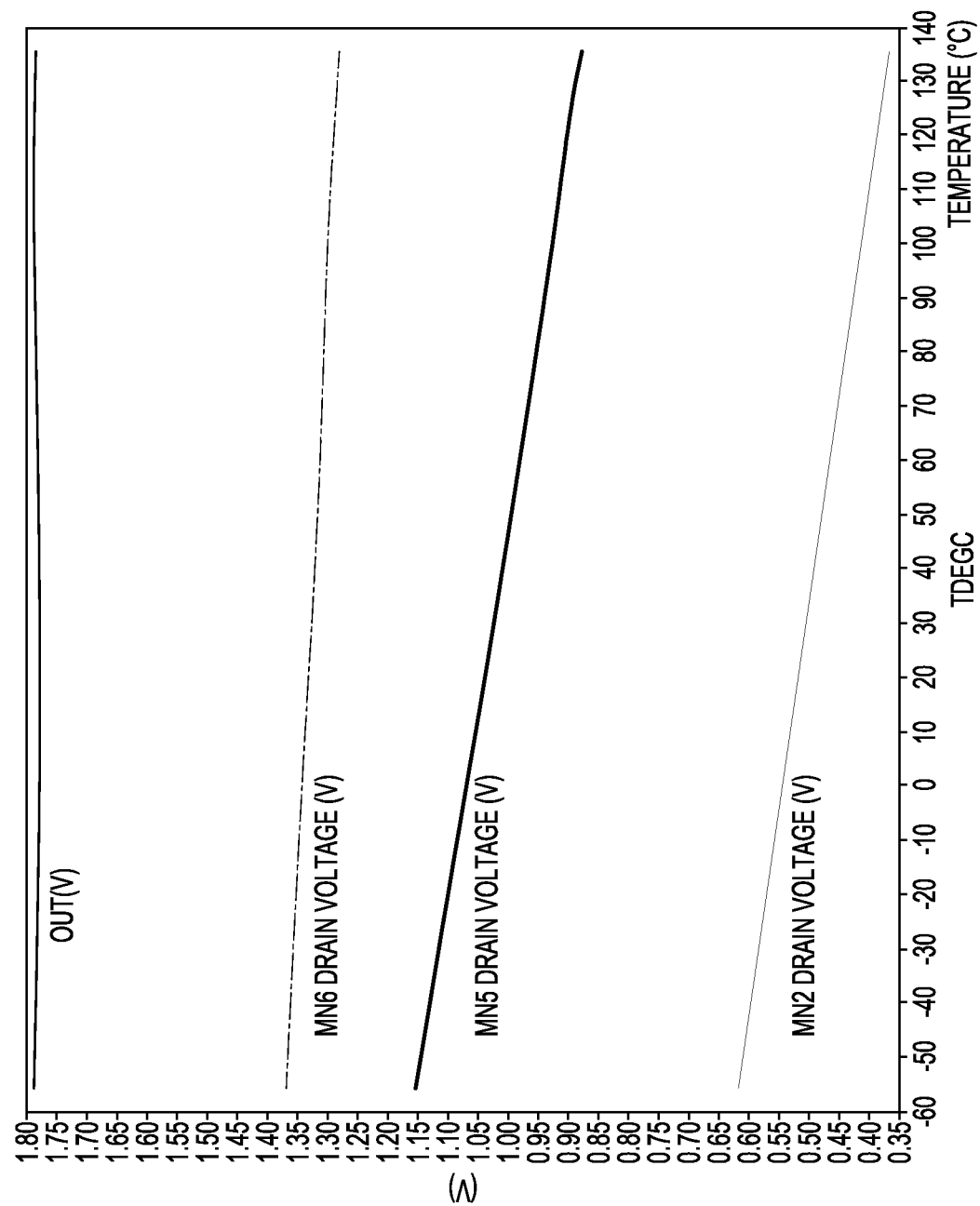
FIG. 21 shows computer simulation plots of voltages over temperature for four nodes of the voltage generator of FIG. 19, according to various embodiments.

FIG. 21 shows computer simulation plots of voltages over temperature for four nodes of voltage generator 1900 of FIG. 19. The voltage at the output node of voltage generator 1900 is relatively constant, hence regulated, over the temperature range from less than −50° C. to greater than 130° C. The voltage at the node for the gate of MN6, used for trimming, decreases over this temperature range. The voltage at the node for the gate of MN5, used to achieve higher output voltage, decreases over this temperature range. The voltage at the node for the gate of MN2, used for providing a VGS with a negative tempco, decreases over this temperature range.

Figure 22:
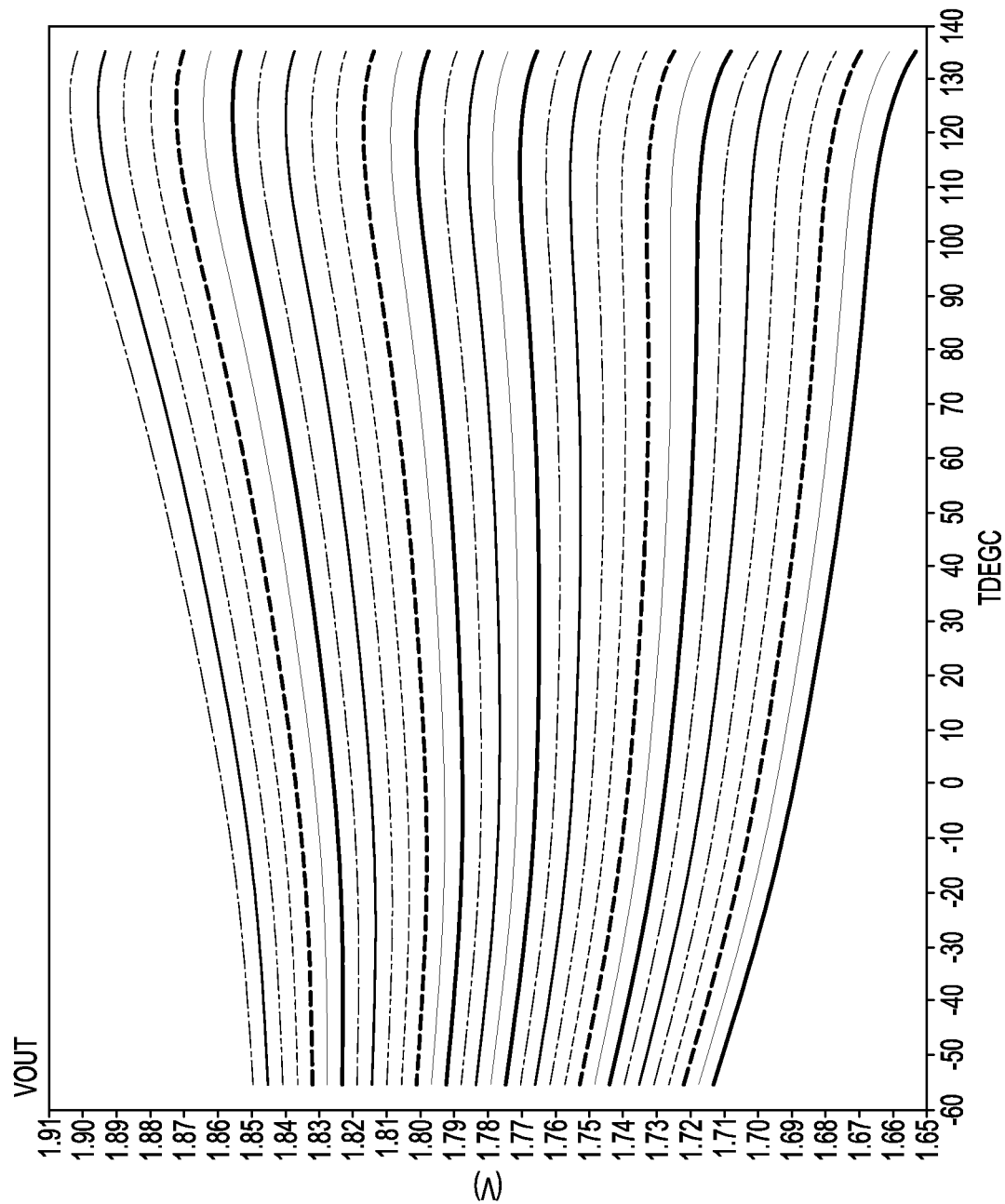
FIG. 22 shows computer simulation plots of output voltages over temperature for the voltage generator of FIG. 19 for various temperature coefficient trim codes, according to various embodiments.
Figure 23:
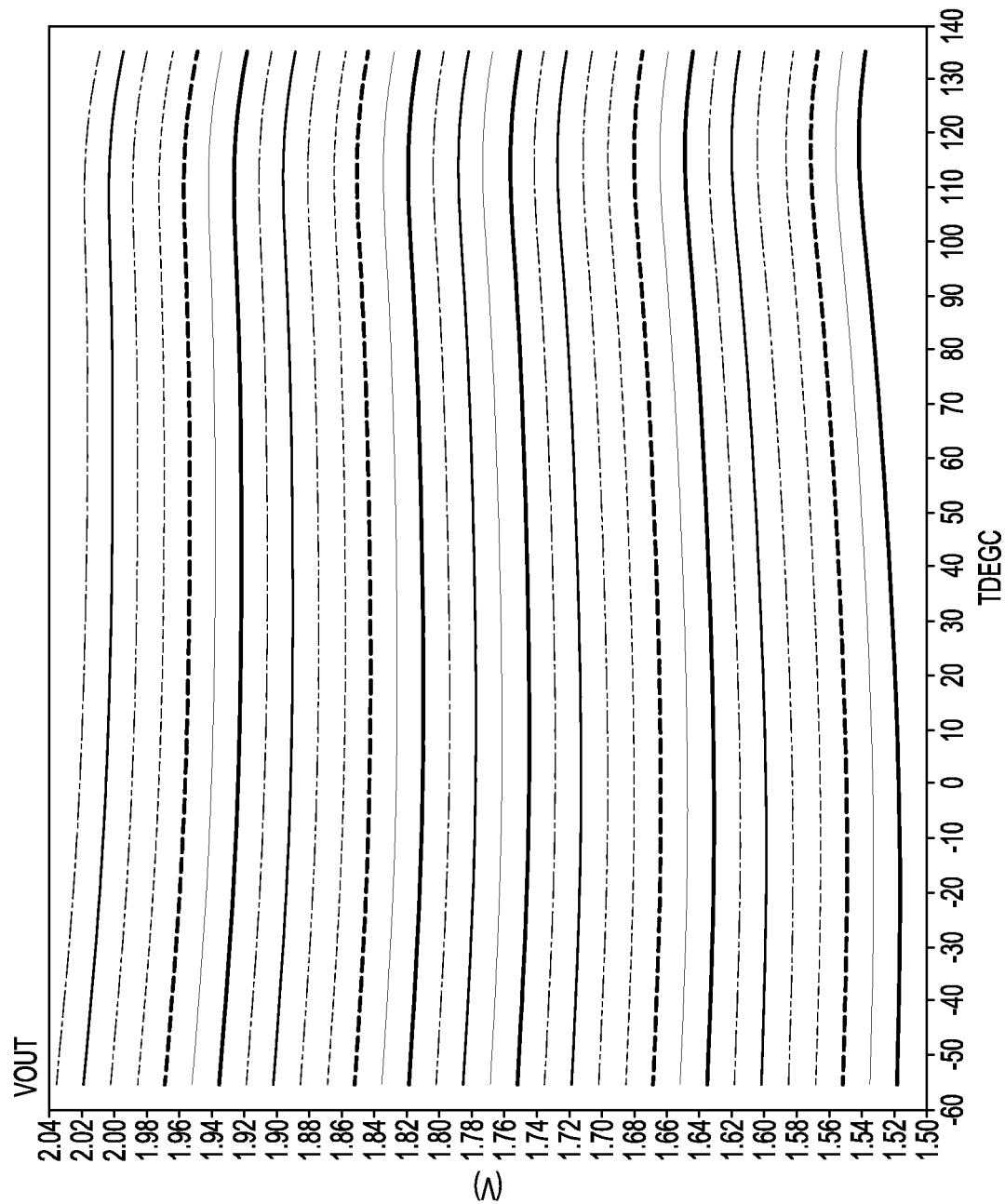
FIG. 23 shows computer simulation plots of output voltages over temperature for the voltage generator of FIG. 19 for various absolute value trim codes, according to various embodiments.

FIG. 22 shows computer simulation plots of output voltages over temperature for voltage generator 1900 of FIG. 19 for various temperature coefficient trim codes. FIG. 23 shows plots of output voltages over temperature for voltage generator 1900 of FIG. 19 for various absolute value trim codes.

Figure 24A:
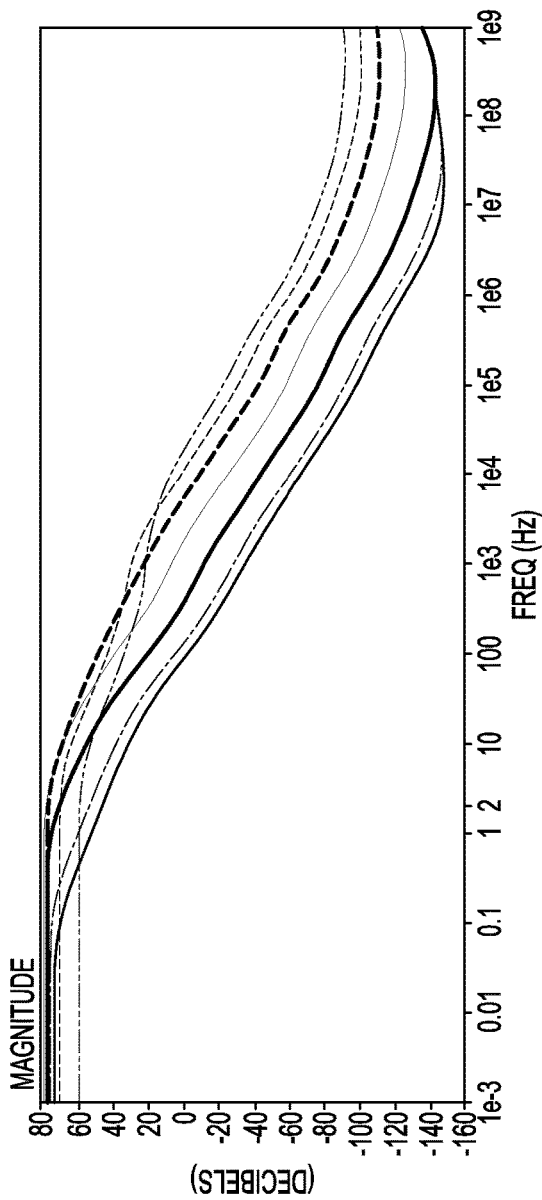
FIGS. 24A-24B show computer simulation plots of open loop gain and phase margin over output current for the voltage generator of FIG. 19, according to various embodiments.
Figure 24B:
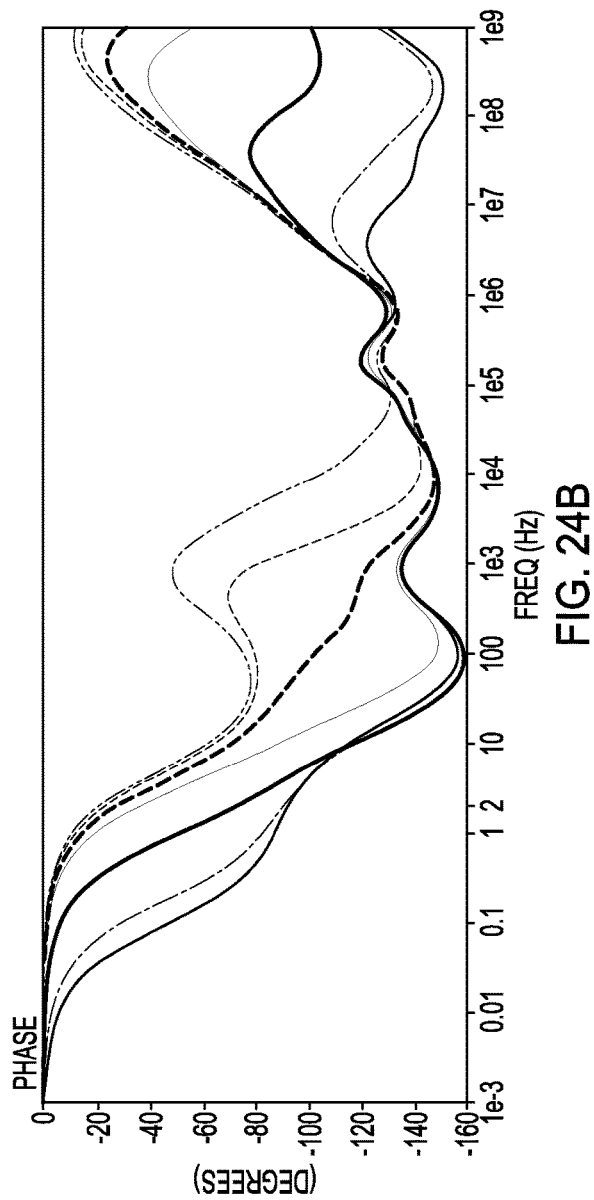

FIG. 24A shows a computer simulation plot of open loop gain over output current for voltage generator 1900 of FIG. 19. This plot is a plot of gain in decibels versus frequency. FIG. 24B shows phase margin over output current for voltage generator 1900 of FIG. 19. This plot is a plot of degrees versus frequency. For these plots, output capacitor was 100 nF and the output current was swept from 10 nA to 10 mA. These results were always stable, with phase margin that does not cross 180 degrees.

Figure 25A:
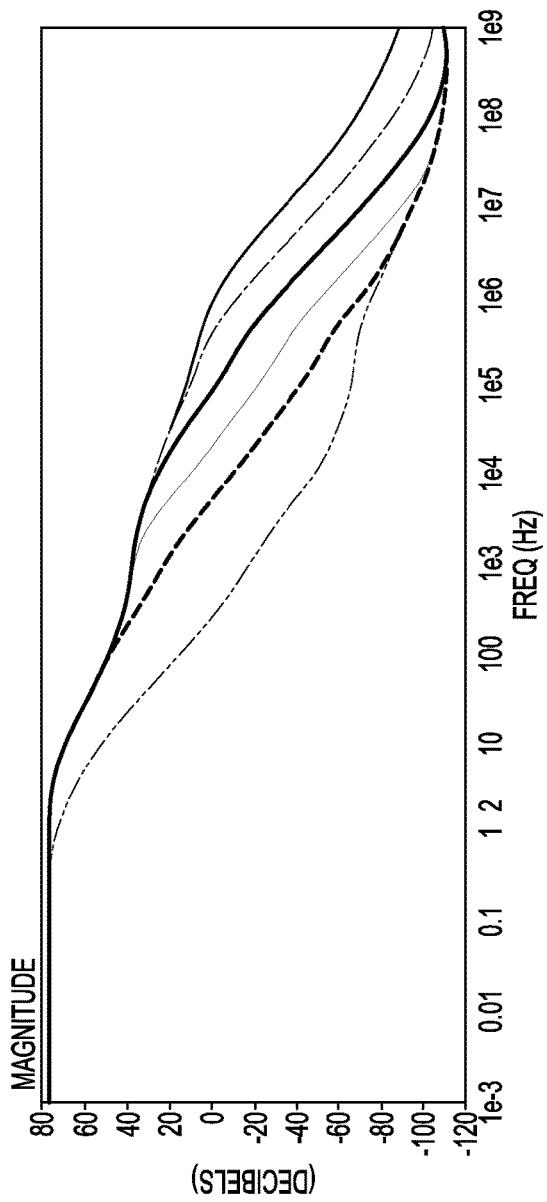
FIGS. 25A-25B show computer simulation plots of open loop gain and phase margin over output capacitor for the voltage generator of FIG. 19, according to various embodiments.
Figure 25B:
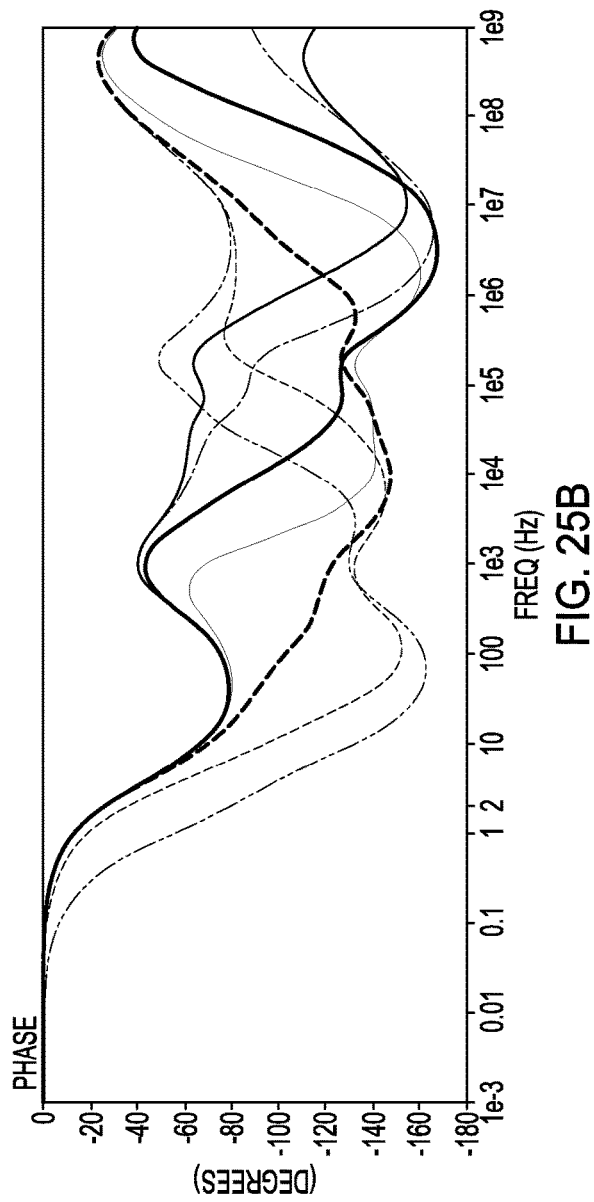

FIG. 25A shows a computer simulation plot of open loop gain over output capacitor for voltage generator 1900 of FIG. 19. This plot is a plot of gain in decibels versus frequency. FIG. 24B shows phase margin over output current for voltage generator 1900 of FIG. 19. This plot is a plot of degrees versus frequency. For these plots, the output current was 100 µA and the output capacitor was swept from 10 pF to 10 µF. These results were always stable, with phase margin that does not cross 180 degrees.

In various embodiments, a voltage generator circuit can comprise: a circuit loop having transistors and a first resistor with the first resistor coupled to a first transistor of the transistors and arranged such that, in operation, current through the first resistor has a first signed temperature coefficient; an output transistor coupled to an output node of the voltage generator circuit; and a transistor coupled to the output transistor through a second resistor, the transistor coupled to the first transistor, the transistor sized such that, in operation, a voltage of the transistor has a second signed temperature coefficient, opposite in sign to the first signed temperature coefficient. The transistors of the circuit loop, the output transistor, the transistor coupled to the output transistor, the first resistor, and the second resistor are sized to provide an output voltage at the output node having a substantially flat temperature coefficient. A transistor structure of the transistors of the loop can be coupled to the first transistor with the first transistor being structured with a different current density than the transistor structure to provide the current through the first resistor with the first signed temperature coefficient.

Variations of such a voltage generator circuit or similar voltage generator circuits can include a number of different embodiments that may be combined depending on the application of such voltage generator circuits and/or the architecture of systems in which such voltage generator circuits are implemented. Such voltage generator circuits can include a second transistor coupled between the transistor and the second resistor, where the second transistor is implemented to achieve a higher output voltage than without the second transistor.

Variations of such a voltage generator circuit or similar voltage generator circuits can include a trimming component, where the trimming component includes the second resistor structured as a variable resistor. Such a voltage generator circuit or similar voltage generator circuits can include a trimming component, where the trimming component includes the second resistor structured as a variable resistor; a third resistor coupled between the output transistor and to the second resistor, with the third resistor structured as a variable resistor; and a trimming transistor coupled to a node coupling the third resistor to the second resistor such that, in operation, a current of constant temperature coefficient flows through the trimming transistor into the third resistor.

Variations of such a voltage generator circuit or similar voltage generator circuits can include a capacitor coupled between the output node and the first transistor. Variations of such a voltage generator circuit or similar voltage generator circuits can include a first capacitor coupled between the output node and the first transistor, and a second capacitor coupled between the output transistor and the first transistor.

In various embodiments, a voltage generator circuit can comprise: means for generating current through a first resistor to have a first signed temperature coefficient based on a difference in current density between transistors in a circuit loop; and means for generating a voltage of a transistor coupled to an output transistor through a second resistor with the transistor sized such that the voltage has a second signed temperature coefficient, opposite in sign to the first signed temperature coefficient. The transistors of the circuit loop, the output transistor, the transistor coupled to the output transistor, the first resistor, and the second resistor are sized to provide an output voltage at an output node having a substantially flat temperature coefficient. Such a voltage generator circuit or similar voltage generator circuits can include a means for a transistor structure to be coupled to the first transistor with the first transistor being structured with a different current density than the transistor structure to provide the current through the first resistor with the first signed temperature coefficient.

Variations of such a voltage generator circuit or similar voltage generator circuits can include a means for compensating for process and part-to-part variation using the second resistor structured as a variable resistor. Such a voltage generator circuit or similar voltage generator circuits can include a means for decoupling temperature coefficient trimming from absolute voltage trimming at the output node. Such a voltage generator circuit or similar voltage generator circuits can include a means for stabilizing the output voltage. Such a voltage generator circuit or similar voltage generator circuits can include a means for providing unconditional stability over load current and load impedance during voltage regulation at the output node.

Figure 26:
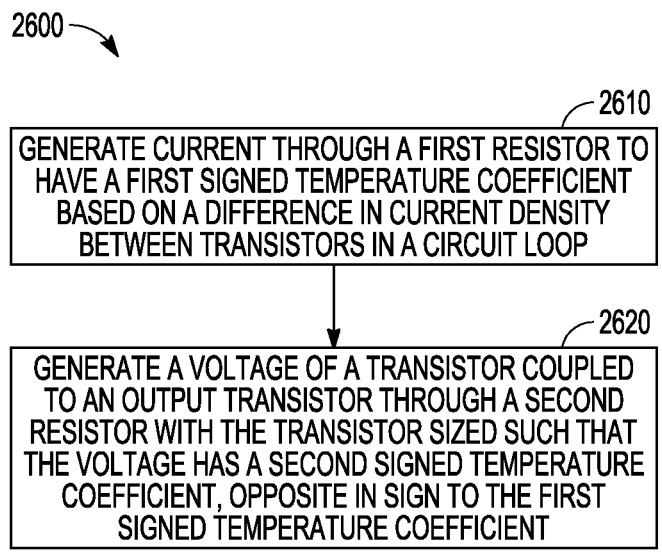
FIG. 26 is a flow diagram of a features of an example of a voltage generation method, according to various embodiments.

FIG. 26 is a flow diagram of a features of an embodiment of an example voltage generation method 2600. At 2610, current is generated through a first resistor to have a first signed temperature coefficient based on a difference in current density between transistors in a circuit loop. Generating current through the first resistor to have a first signed temperature coefficient can include using a transistor structure coupled to the first transistor with the first transistor being structured with a different current density than the transistor structure.

At 2620, a voltage of a transistor generated, where the transistor is coupled to an output transistor through a second resistor with the transistor sized such that the voltage has a second signed temperature coefficient, opposite in sign to the first signed temperature coefficient. The transistors of the circuit loop, the output transistor, the transistor coupled to the output transistor, the first resistor, and the second resistor are sized to provide an output voltage at the output node having a substantially flat temperature coefficient.

Variations of the method 2600 or methods similar to the method 2600 can include a number of different embodiments that may be combined depending on the application of such methods and/or the architecture of systems in which such methods are implemented. Such methods can include providing a level of the output voltage based on a second transistor coupled between the transistor and the second resistor. Such methods can include compensating for process and part-to-part variation using the second resistor structured as a variable resistor.

Variations of the method 2600 or methods similar to the method 2600 can include independently adjusting the second resistor structured as a variable resistor and a third resistor coupled between the output transistor and the second resistor, the third resistor structured as a variable resistor, to generate a temperature stabilized output voltage at an output node. Variations of the method 2600 or methods similar to the method 2600 can include providing a current of constant temperature coefficient to flow through a trimming transistor into the third resistor, where the trimming transistor is coupled to a node coupling the third resistor to the second resistor.

Variations of the method 2600 or methods similar to the method 2600 can include stabilizing the output voltage using a capacitor coupled between the output node and the first transistor. Variations of the method 2600 or methods similar to the method 2600 can include providing unconditional stability over load current and load impedance during voltage regulation at the output node using a first capacitor coupled between the output node and the first transistor and a second capacitor coupled between the output transistor and the first transistor.

In various embodiments associated with FIGS. 1-26, components of a voltage generator circuit, which can be implemented as a LDO regulator, are arranged with structures that provide selected temperature coefficients for the voltage generator circuit to provide a stable output. A voltage generator circuit can be implemented based on tempcos of its components. In various embodiments, a voltage generator circuit comprises: a first voltage generator circuit, providing a first voltage having a first signed temperature coefficient based on a difference in current density between transistors; and a second voltage generator circuit, providing a second voltage having a second signed temperature coefficient, opposite in sign to the first signed temperature coefficient, wherein the first voltage and the second voltage are configured in series with each other to generate a temperature stabilized output voltage at an output node.

In various embodiments, a voltage generator circuit comprises: a first voltage generator circuit, providing a first voltage having a first signed temperature coefficient based on a difference in current density between transistors; a second voltage generator circuit, providing a second voltage having a second signed temperature coefficient, opposite in sign to the first signed temperature coefficient; and a third voltage generator circuit, providing a third voltage having a third signed temperature coefficient that is opposite in sign to the first signed temperature coefficient, with the third voltage generator circuit including independently adjustably specifiable temperature dependent and temperature stable components, wherein the first voltage, the second voltage, and the third voltage are configured in series with each other to generate a temperature stabilized output voltage at an output node.

Variations of such voltage generator circuits or similar voltage generator circuits that are structured based on tempcos of their components can include a number of different embodiments that may be combined depending on the application of such voltage generator circuits and/or the architecture of systems in which such voltage generator circuits are implemented. Such voltage generator circuits can include a first compensation capacitor, located between the output voltage node and a control terminal of said transistors; and a second compensation capacitor, located between a conduction terminal and the control terminal of said transistors, wherein the first and second compensation capacitors are configured to provide unconditional stability over load current and load impedance during voltage regulation at the output node. Such voltage generator circuits can include a current mirror circuit biasing the transistors; and an output transistor, driven by the current mirror, and coupled to regulate the temperature stabilized output voltage at the output node.

In various embodiments, a voltage generation method comprises: generating a first voltage having a first signed temperature coefficient based on a difference in current density between transistors; generating a second voltage having a second signed temperature coefficient, opposite in sign to the first signed temperature coefficient; and providing the first voltage and the second voltage in series with each other to generate a temperature stabilized output voltage at an output node.

In various embodiments, a voltage generation method is provided that comprises: generating a first voltage having a first signed temperature coefficient based on a difference in current density between transistors; generating a second voltage having a second signed temperature coefficient, opposite in sign to the first signed temperature coefficient; generating a third voltage third voltage having a third signed temperature coefficient that is opposite in sign to the first signed temperature coefficient, wherein the third voltage is generated from independently adjustably specifiable temperature dependent and temperature stable components; and providing the first voltage, the second voltage, and the third voltage in series with each other to generate a temperature stabilized output voltage at an output node.

The following are example embodiments of voltage generator circuits and methods, in accordance with the teachings herein.

An example voltage generator circuit 1 can comprise a circuit loop having transistors and a first resistor with the first resistor coupled to a first transistor of the transistors and arranged such that, in operation, current through the first resistor has a first signed temperature coefficient; an output transistor coupled to an output node of the voltage generator circuit; and a transistor coupled to the output transistor through a second resistor, the transistor coupled to the first transistor, the transistor sized such that, in operation, a voltage of the transistor has a second signed temperature coefficient, opposite in sign to the first signed temperature coefficient, wherein the transistors of the circuit loop, the output transistor, the transistor coupled to the output transistor, the first resistor, and the second resistor are sized to provide an output voltage at the output node having a substantially flat temperature coefficient.

An example voltage generator circuit 2 can include features of example voltage generator circuit 1 and can include a transistor structure of the transistors of the loop coupled to the first transistor with the first transistor being structured with a different current density than the transistor structure to provide the current through the first resistor with the first signed temperature coefficient.

An example voltage generator circuit 3 can include features of any of the preceding example voltage generator circuits and can include a second transistor coupled between the transistor and the second resistor.

An example voltage generator circuit 4 can include features of any of the preceding example voltage generator circuits and can include a trimming component, the trimming component including the second resistor structured as a variable resistor.

An example voltage generator circuit 5 can include features of any of the preceding example voltage generator circuits and can include a trimming component, the trimming component including: the second resistor structured as a variable resistor; a third resistor coupled between the output transistor and the second resistor, the third resistor structured as a variable resistor; and a second transistor for trimming coupled to a node coupling the third resistor to the second resistor such that, in operation, a current of constant temperature coefficient flows through the second transistor into the third resistor.

An example voltage generator circuit 6 can include features of any of the preceding example systems and can include a capacitor coupled between the output node and the first transistor.

An example voltage generator circuit 7 can include features of any of the preceding example systems and can include a first capacitor coupled between the output node and the first transistor; and a second capacitor coupled between the output transistor and the first transistor.

An example voltage generator circuit 8 can include features of any of the preceding example systems and can include the first capacitor is coupled between the output node and the first transistor by a third resistor, and the second capacitor is coupled between the output transistor and the first transistor by a fourth resistor.

An example voltage generator circuit 9 can comprise: means for generating current through a first resistor to have a first signed temperature coefficient based on a difference in current density between transistors in a circuit loop; and means for generating a voltage of a transistor coupled to an output transistor through a second resistor with the transistor sized such that the voltage has a second signed temperature coefficient, opposite in sign to the first signed temperature coefficient, wherein the transistors of the circuit loop, the output transistor, the transistor coupled to the output transistor, the first resistor, and the second resistor are sized to provide an output voltage at an output node having a substantially flat temperature coefficient.

An example voltage generator circuit 10 can include features of example voltage generator circuit 9 and can include a means for compensating for process and part-to-part variation using the second resistor structured as a variable resistor.

An example voltage generator circuit 11 can include features of any of the preceding example voltage generator circuits 9 and 10 and can include a means for decoupling temperature coefficient trimming from absolute voltage trimming at the output node.

An example voltage generator circuit 12 can include features of any of the preceding example voltage generator circuits 9-11 and can include a means for stabilizing the output voltage.

An example voltage generator circuit 13 can include features of any of the preceding example voltage generator circuits 9-12 and can include a means for providing unconditional stability over load current and load impedance during voltage regulation at the output node.

An example voltage generation method 1 can comprise: generating current through a first resistor to have a first signed temperature coefficient based on a difference in current density between transistors in a circuit loop; and generating a voltage of a transistor coupled to an output transistor through a second resistor with the transistor sized such that the voltage has a second signed temperature coefficient, opposite in sign to the first signed temperature coefficient, wherein the transistors of the circuit loop, the output transistor, the transistor coupled to the output transistor, the first resistor, and the second resistor are sized to provide an output voltage at the output node having a substantially flat temperature coefficient.

An example voltage generation method 2 can include features of example voltage generation methods 1 and can include generating current through the first resistor to have a first signed temperature coefficient to include using a transistor structure coupled to the first transistor with the first transistor being structured with a different current density than the transistor structure.

An example voltage generation method 3 can include features of any of the preceding example voltage generation methods and can include providing a level of the output voltage based on a second transistor coupled between the transistor and the second resistor.

An example voltage generation method 4 can include features of any of the preceding example voltage generation methods and can include compensating for process and part-to-part variation using the second resistor structured as a variable resistor.

An example voltage generation method 5 can include features of any of the preceding example voltage generation methods and can include independently adjusting the second resistor structured as a variable resistor and a third resistor coupled between the output transistor and the second resistor, the third resistor structured as a variable resistor, to generate a temperature stabilized output voltage at an output node.

An example voltage generation method 6 can include features of any of the preceding example voltage generation methods and can include providing a current of constant temperature coefficient to flow through a second transistor into the third resistor, the second transistor coupled to a node coupling the third resistor to the second resistor.

An example voltage generation method 7 can include features of any of the preceding example voltage generation methods and can include stabilizing the output voltage using a capacitor coupled between the output node and the first transistor.

An example voltage generation method 8 can include features of any of the preceding example voltage generation methods and can include providing unconditional stability over load current and load impedance during voltage regulation at the output node using a first capacitor coupled between the output node and the first transistor and a second capacitor coupled between the output transistor and the first transistor.

An example voltage generation method 9 can include features of any of the preceding example voltage generation methods and can include performing functions associated with any features of example voltage generator circuits 1-13 and any features of example voltage generator circuits associated with the figures herein.

The above detailed description refers to the accompanying drawings that show, by way of illustration and not limitation, various embodiments that can be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The above detailed description is, therefore, not to be taken in a limiting sense.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description.

What is claimed is:

1. A voltage generator circuit comprising:
  a circuit loop having transistors and a first resistor with the first resistor coupled to a first transistor of the transistors and arranged such that, in operation, current through the first resistor has a first signed temperature coefficient;
  an output transistor coupled to an output node of the voltage generator circuit;
  a transistor coupled to the output transistor through a second resistor, the transistor coupled to the first transistor, the transistor being a field effect transistor (FET) sized such that, in operation, a voltage of the transistor has a second signed temperature coefficient, opposite in sign to the first signed temperature coefficient, wherein the transistors of the circuit loop, the output transistor, the transistor coupled to the output transistor, the first resistor, and the second resistor are sized to provide an output voltage at the output node having a substantially flat temperature coefficient; and a trimming component including:
the second resistor structured as a variable resistor;
a third resistor coupled between the output transistor and the second resistor, the third resistor structured as a variable resistor; and
a second transistor having a drain terminal coupled to a node coupling the third resistor to the second resistor and a control terminal coupled to a control terminal of the transistor coupled to the output transistor.

2. The voltage generator circuit of claim 1, wherein a transistor structure of the transistors of the loop is coupled to the first transistor with the first transistor being structured with a different current density than the transistor structure to provide the current through the first resistor with the first signed temperature coefficient.

3. The voltage generator circuit of claim 2, wherein the voltage generator circuit includes another transistor coupled as a cascode connection between the transistor and the second resistor.

4. The voltage generator circuit of claim 2, wherein the second transistor has a different threshold voltage than the transistor coupled to the output transistor such that, in operation, a current of constant temperature coefficient flows through the second transistor into the third resistor.

5. The voltage generator circuit of claim 1, wherein the voltage generator circuit includes a capacitor coupled between the output node and the first transistor.

6. The voltage generator circuit of claim 1, wherein the voltage generator circuit includes:
a first capacitor coupled between the output node and the first transistor; and
a second capacitor coupled between the output transistor and the first transistor.

7. The voltage generator circuit of claim 6, wherein the first capacitor is coupled between the output node and the first transistor by a fifth resistor, and the second capacitor is coupled between the output transistor and the first transistor by a fourth resistor.

8. A voltage generation method comprising:
generating current through a first resistor to have a first signed temperature coefficient based on a difference in current density between transistors in a circuit loop; and
generating a voltage of a transistor coupled to an output transistor through a second resistor with the transistor being a field effect transistor (FET) sized such that the voltage has a second signed temperature coefficient, opposite in sign to the first signed temperature coefficient, wherein the transistors of the circuit loop, the output transistor, the transistor coupled to the output transistor, the first resistor, and the second resistor are sized to provide an output voltage at an output node having a substantially flat temperature coefficient; and
decoupling temperature coefficient trimming from absolute voltage trimming at the output node using a trimming circuit coupled to the output transistor, the transistor coupled to the output transistor, and a second transistor;
wherein the second transistor is coupled to the transistor coupled to the output transistor and has a different threshold voltage than the transistor coupled to the output transistor.

9. The voltage generation method of claim 8, wherein generating current through the first resistor to have the first signed temperature coefficient includes using a transistor structure coupled to a first transistor with the first transistor being structured with the different current density than the transistor structure.

10. The voltage generation method of claim 9, wherein the method includes providing a level of the output voltage based on another transistor coupled between the second resistor and the transistor coupled to the output transistor.

11. The voltage generation method of claim 9, wherein the method includes compensating for process and part-to-part variation using the second resistor structured as a variable resistor of the trimming circuit.

12. The voltage generation method of claim 9, wherein the method includes independently adjusting the second resistor structured as a variable resistor of the trimming circuit and a third resistor coupled between the output transistor and the second resistor, the third resistor structured as a variable resistor of the trimming circuit, to generate a temperature stabilized output voltage at the output node.

13. The voltage generation method of claim 12, wherein the method includes providing a current of constant temperature coefficient to flow through the second transistor into the third resistor, the second transistor coupled to a node coupling the third resistor to the second resistor.

14. The voltage generation method of claim 8, wherein the method includes stabilizing the output voltage using a capacitor coupled between the output node and the first transistor.

15. The voltage generation method of claim 8, wherein the method includes providing unconditional stability over load current and load impedance during voltage regulation at the output node using a first capacitor coupled between the output node and the first transistor and a second capacitor coupled between the output transistor and the first transistor.

16. A voltage generator circuit comprising:
a circuit loop for generating current through a first resistor to have a first signed temperature coefficient based on a difference in current density between transistors in the circuit loop; and
means for generating a voltage of a transistor coupled to an output transistor through a second resistor with the transistor being a field effect transistor sized such that the voltage has a second signed temperature coefficient, opposite in sign to the first signed temperature coefficient, wherein the transistors of the circuit loop, the output transistor, the transistor coupled to the output transistor, the first resistor, and the second resistor are sized to provide an output voltage at an output node having a substantially flat temperature coefficient; and
trimming means for decoupling temperature coefficient trimming from absolute voltage trimming at the output node, wherein the trimming means includes a second transistor having a control terminal coupled to a control terminal of the transistor coupled to the output transistor and having a threshold voltage different than a threshold voltage of the transistor coupled to the output transistor.

17. The voltage generator circuit of claim 16, wherein the voltage generator circuit includes the trimming means for compensating for process and part-to-part variation using the second resistor structured as a variable resistor.

18. The voltage generator circuit of claim 16, wherein the voltage generator circuit includes compensation means for providing unconditional stability over load current and load impedance during voltage regulation at the output node.

* * * * *